US008510136B2

(12) United States Patent
Charania et al.

(10) Patent No.: US 8,510,136 B2
(45) Date of Patent: Aug. 13, 2013

(54) EVENT TICKET PURCHASING

(75) Inventors: Rahim A. Charania, Euless, TX (US);
Gangadhar R. Gogineni, Hyderabad (IN); Puneet Kalia, Hyderabad (IN);
Ashutosh Sureka, Irving, TX (US);
Prakash Srinivasan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 12/241,839

(22) Filed: Sep. 30, 2008

(65) Prior Publication Data
US 2010/0082374 A1 Apr. 1, 2010

(51) Int. Cl.
*G06Q 10/00* (2012.01)

(52) U.S. Cl.
USPC .............................................. 705/5

(58) Field of Classification Search
USPC ............... 705/26, 27, 14, 15, 5; 707/102, 707/10, 104.1
See application file for complete search history.

(56) References Cited

U.S. PATENT DOCUMENTS

| 5,459,306 | A | * | 10/1995 | Stein et al. | 235/383 |
| 6,502,076 | B1 | * | 12/2002 | Smith | 705/14.54 |
| 6,732,080 | B1 | * | 5/2004 | Blants | 705/7.18 |
| 6,816,778 | B2 | * | 11/2004 | Diaz | 701/200 |
| 6,925,469 | B2 | * | 8/2005 | Headings et al. | 707/102 |
| 2004/0043758 | A1 | * | 3/2004 | Sorvari et al. | 455/414.1 |
| 2004/0093281 | A1 | * | 5/2004 | Silverstein et al. | 705/26 |
| 2005/0076364 | A1 | * | 4/2005 | Dukes et al. | 725/46 |
| 2006/0200258 | A1 | * | 9/2006 | Hoffberg et al. | 700/86 |
| 2007/0180469 | A1 | * | 8/2007 | Finley et al. | 725/46 |
| 2007/0214454 | A1 | * | 9/2007 | Edwards et al. | 717/176 |
| 2008/0255890 | A1 | * | 10/2008 | Hilliard | 705/5 |
| 2010/0017109 | A1 | * | 1/2010 | Pauwels | 701/200 |

OTHER PUBLICATIONS (Item 1) http://web.archive.org/web/20070827130212/www.fandango.com/AboutUs.aspx (4 of 4)Apr. 5, 2009.*
(Item 2) http://web.archive.org/web/20070928223940/wwwfandango.com/default.aspx (15 of 15)Apr. 6, 2009.*
Business Wire, "Soapbox Mobile Completes P.O.S. Integration With Radiant Systems for Mobile Movie Ticket Sales; Moviegoers Can Buy Tickets Via Their Mobile Devices; System Being Demonstrated at ShoWEST in Las Vegas," New York, Mar. 15, 2005, 1.*

* cited by examiner

*Primary Examiner* — Nathan Erb

(57) ABSTRACT

A method may include aggregating information regarding events, where for each event the aggregated information includes an event name, an event time, and an event venue. The method may further include receiving a request for a list of events or a list of venues from a user device and obtaining, from the user device, a profile of a user of the user device. The method may further include generating, based on the profile and the aggregated information regarding events, the generated list of events or the list of venues and sending, to the user device, the list of events or the list of venues.

22 Claims, 25 Drawing Sheets

500A

500B

EVENT TICKET PURCHASING

BACKGROUND INFORMATION

A stadium or arena may host hockey games, basketball games, concerts, etc. Movie theaters may host many different movies. Purchasing tickets for one of these events, however, may require an entirely different procedure from purchasing tickets for another one of these events.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

One or more embodiments disclosed herein may allow for a user to purchase event tickets, such as movie tickets, theater tickets, or sporting event tickets, through a display of a user device, such as a home telephone. The user device may recommend, to the user, events or venues that the user may be interested in, based on a profile of the user. The user device may also forward the location of the event to the user's navigation device, for example, or forward ticket information to the user's mobile communication device.

Figure 1:
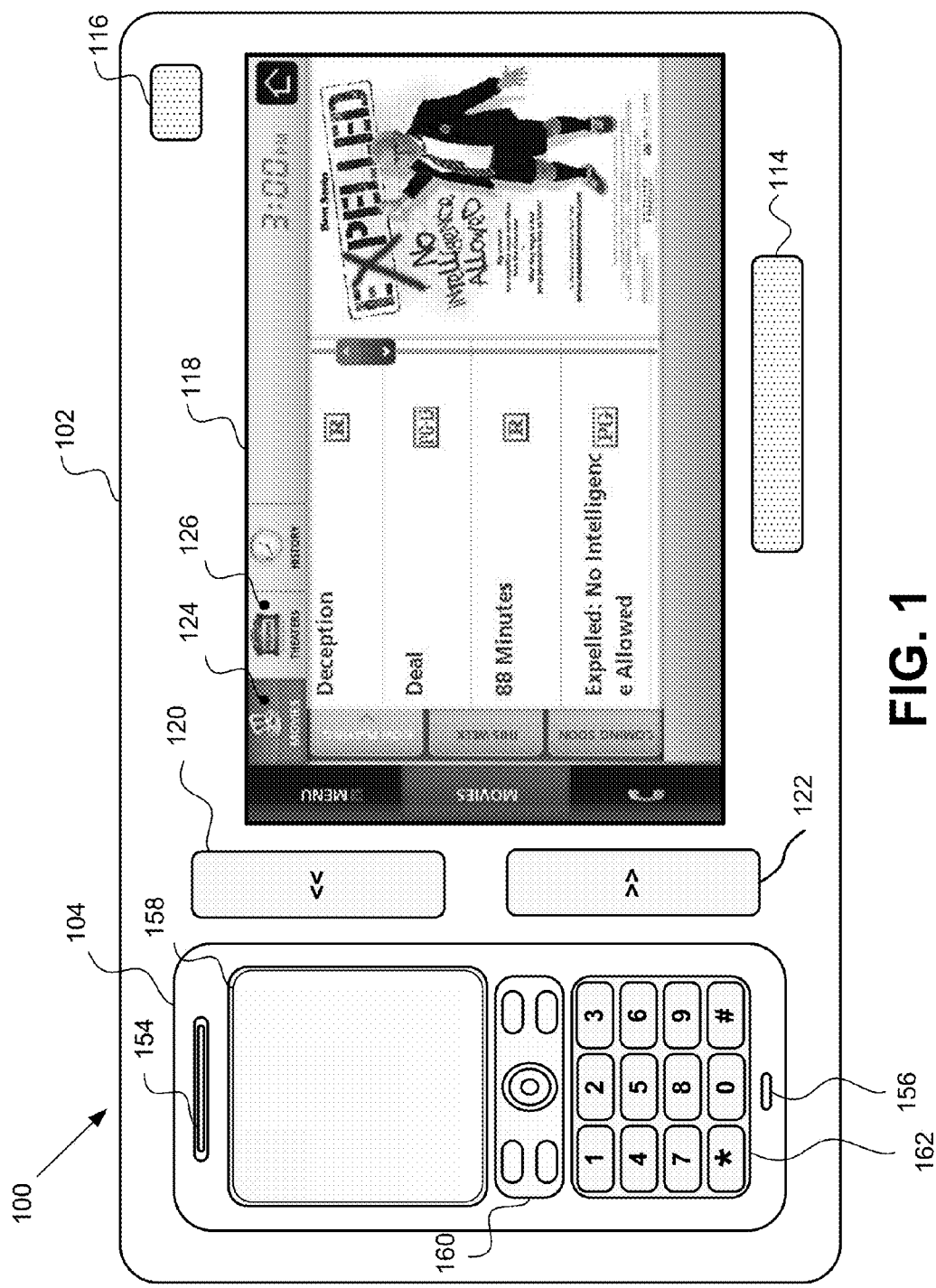
FIG. 1 is a block diagram of an exemplary user device in which embodiments disclosed herein may be implemented.

FIG. 1 is diagram of an exemplary user device 100. As illustrated, user device 100 may include a base 102 and a handset 104. User device 100 may include the functionality of a telephone and the ability to purchase event tickets, among other things. For example, base 102 may include a screen 118 that displays events, e.g., movies, for which the user of device 100 may browse and purchase tickets. Functioning as a telephone, a user may answer a call by picking up handset 104 from base 102. In this example, handset 104 may communicate with base 102, which may communicate with a telephone network, for example.

Base 102 may include a speaker 114, a microphone 116, display 118, and control buttons 120 and 122. Handset 104 may include speaker 154, a microphone 156, a display 158, control keys 160, and a keypad 162. User device 100 may include other components (not shown) that aid in receiving, transmitting, and/or processing data. Moreover, other configurations of user device 100 are possible.

Regarding base 102, speaker 114 may provide audible information to a user and microphone 116 may receive audible information from the user. Display 118 may include a display screen to provide visual information to the user, such as video images or pictures. For example, display 118 may provide information regarding incoming or outgoing telephone calls, telephone numbers, contact information, current time, voicemail, email, etc. Display 118 may also provide information, as shown in FIG. 1, regarding events, such as movies, theater events, sporting events, etc. Display 118 may include a touch-screen display to accept inputs from the user. For example, display 118 may include a MOVIES icon 124 which, when touched, may cause user device 100 to list movie events. Display 118 may also include a THEATERS icon 126 which, when touched, may cause user device 100 to list movie theaters that host movie events, for example.

Control buttons 120 and 122 may permit the user to interact with user device 100 to cause user device 100 to perform one or more operations, such as advancing information displayed on display 118 backward (e.g., by pressing button 120) or forward (e.g., by pressing button 122). In one embodiment, control buttons 120 and 122 may include soft keys that may perform the functions indicated on display 118 directly next to the buttons.

Regarding handset 104, speaker 154 may provide audible information to a user of handset 104. Microphone 156 may receive audible information from the user of handset 104. Display 158 may include a display screen to provide visual information to the user, such as video images or pictures, and may include a touch-screen display to accept inputs from the user. For example, display 158 may provide information regarding incoming or outgoing telephone calls, telephone numbers, contact information, current time, voicemail, email, etc.

Control keys 160 may permit the user of handset 104 to interact with handset 104 and/or user device 100 to cause handset 104 and/or user device 100 to perform one or more operations. In one embodiment, control keys 160 may include soft keys that may perform the functions indicated on display 158. Keypad 162 may include a standard telephone keypad and may include additional keys to enable inputting (e.g., typing) information into user device 100.

Figure 2:
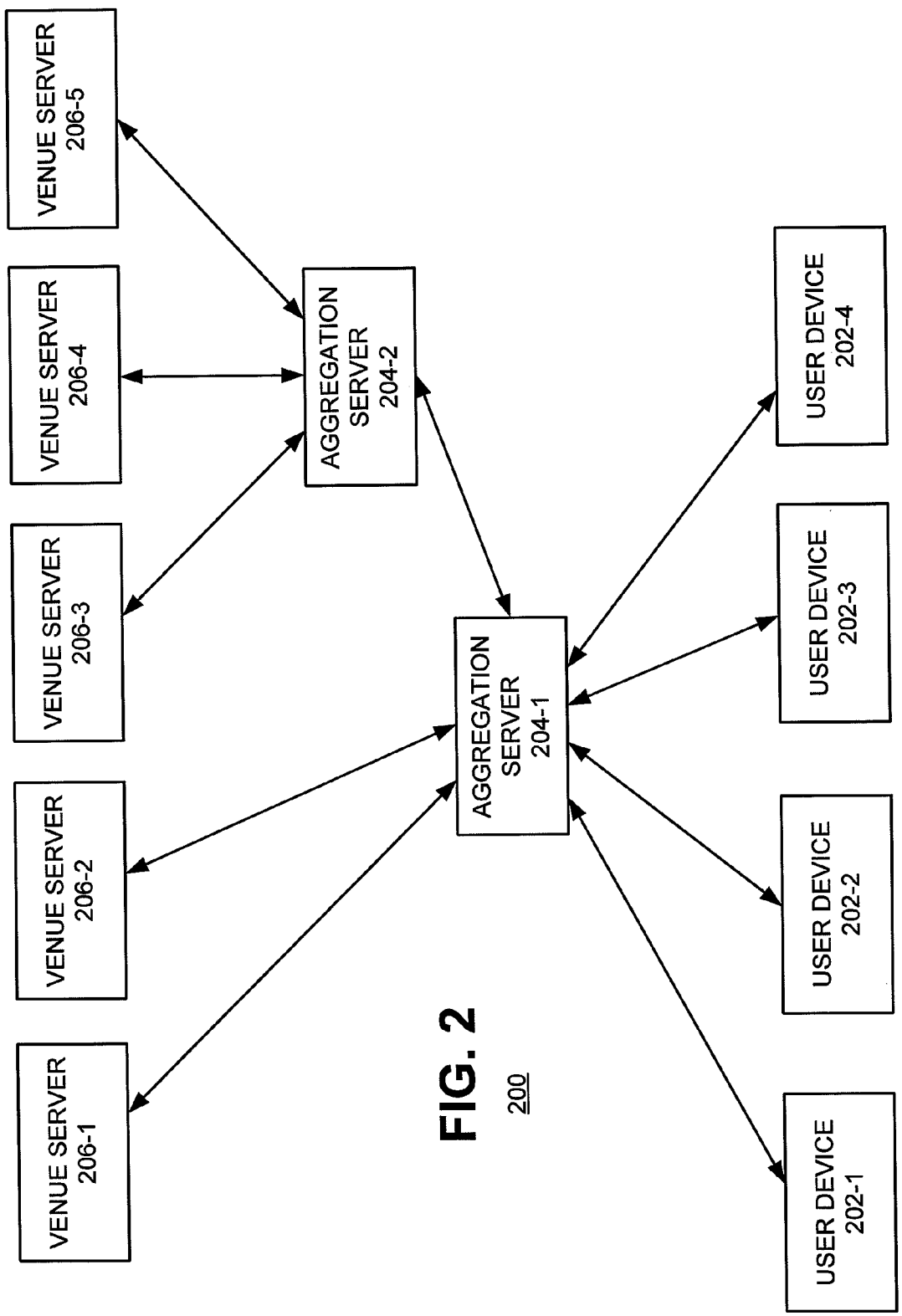
FIG. 2 is a block diagram of an exemplary network in which embodiments described herein may be implemented.

FIG. 2 shows an exemplary network 200 in which embodiments described herein may be implemented. As shown in FIG. 2, network 200 may include user devices 202-1 through 202-4 (collectively "user devices 202," individually "user device 202-x"), aggregation servers 204-1 and 204-2 (collectively "aggregation servers 204," individually "aggregation server 204-x"), and venue servers 206-1 through 206-5 (collectively "venue servers 206," individually "venue server 206-x"). In other embodiments, network 200 may include more, fewer, or different devices. Moreover, one or more devices 202-206 may perform one or more functions of any other device in network 200. Furthermore, one or more of devices 202-206 may be remotely located from each other, e.g., devices 202-206 may be geographically diverse.

Although FIG. 2 shows devices 202-206 coupled to each other in a particular configuration, devices 202-206 may also be arranged in other configurations, either coupling directly with each other or through one or more networks, such that any one of devices 202-206 may communicate with any other one of devices 202-206. For example, any one of devices 202-206 may communicate with any other one of devices 202-206 through a high-speed fiber-optic network (e.g., FiOS™), the Internet, an ad hoc network, a local area network (LAN), a wide area network (WAN), a metropolitan area network (MAN), a cellular network, a public-switched telephone network (PSTN), or any other network or combinations of networks. Any one of devices 202-206 may communicate with any other one of devices 202-206 through wired links (e.g., fiber optic, twisted pair, or coaxial cable) or wireless links (e.g., Evolution-Data Optimized (EV-DO), Worldwide Interoperability for Microwave Access (WiMAX), High-Speed Downlink Packet Access (HSDPA), WiFi (e.g., IEEE 802), etc.).

User devices 202 may include one or more user devices 100 as shown in FIG. 1 and described above. As such, user device **202-*x* may include one or more computer systems for hosting programs, databases, and/or applications. For example, user device 202-*x* may host a program for a user to place or receive telephone calls. User device 202-*x* may also host a program to allow a user to browse and purchase event tickets. In one embodiment, user device 202-*x* may be a stationary (e.g., home) telephone. In another embodiment, user device 202-*x*** may be a mobile (e.g., cellular) telephone.

Venue servers 206 may include one or more computer systems for hosting programs, databases, and/or applications. For example, venue servers 206 may host database programs and may store databases having venue (e.g., event and ticketing) information. Venue server 206-1 may store the venue information related to, for example, a stadium or arena. The venue information may include event titles, descriptions, locations, ticket prices, seat information, etc. As another example, venue server 206-3, 206-4, and 206-5 may each include the venue information for a different movie theater. In this implementation, the venue information may include movie titles, descriptions, trailers, ticket prices, locations, show times, ratings, etc.

Aggregation servers 204 may include one or more computer systems for hosting programs, databases, and/or applications. Aggregation server **204-*x* may aggregate the venue information from one or more of venue servers 206 and/or another aggregation server 204-*x*. For example, where venue server 206-3 through 206-5 each store venue information related to a different movie theater, then aggregation server 204-2 may aggregate (e.g., collect) the venue information (e.g., movie titles, ticket prices, movie times, etc.) for a group of movie theaters. Where venue server 206-1 stores the venue information related to a stadium or arena, aggregation server 204-1 may aggregate the venue information for the stadium or arena as well as the group of movie theaters (e.g., from aggregation server 204-1). Aggregation servers 204 may allow user devices 202 to retrieve venue information aggregated from venue servers 106. For example, aggregation servers 204 may allow user device 202-1 to browse movies playing at theaters, e.g., browse the venue information stored in venue servers 206-3, 206-4, and 206-5**.

Figure 3:
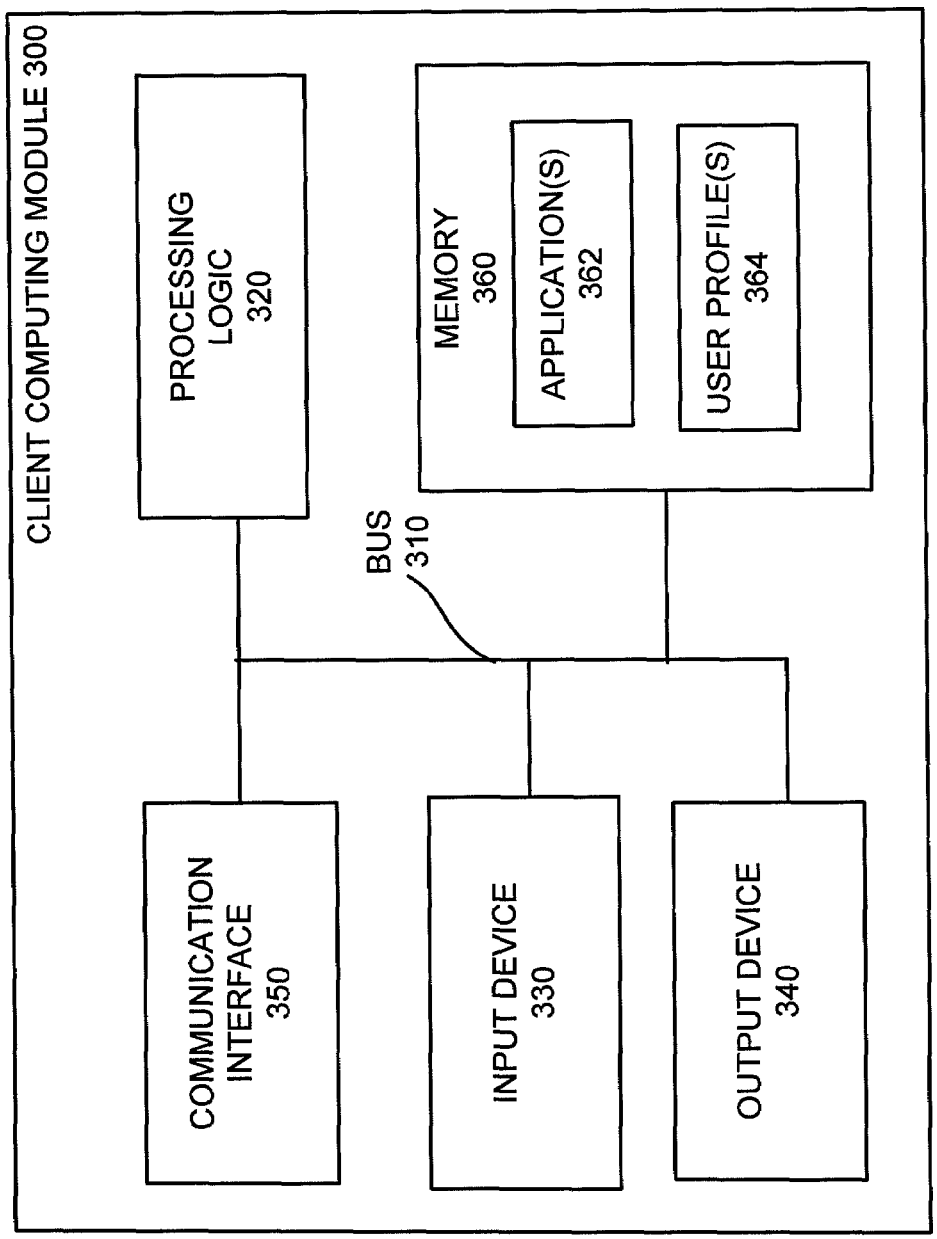
FIG. 3 is a block diagram of exemplary components of a client computing module.

FIG. 3 is a block diagram of exemplary components of a client computing module 300. User devices 202 may each include one or more client computing modules 300. For example, base 102 may include an instance of client computing module 300 and handset 104 may include another instance of client computing module 300. Client computing module 300 may include a bus 310, processing logic 320, an input device 330, an output device 340, a communication interface 350, and a memory 360. Client computing module 300 may include other components (not shown) that aid in receiving, transmitting, and/or processing data. Moreover, other configurations of components in client computing module 300 are possible.

Bus 310 may include a path that permits communication among the components of client computing module 300.

Processing logic 320 may include any type of processor or microprocessor (or groups of processors or microprocessors) that interprets and executes instructions. In other embodiments, processing logic 320 may include an application-specific integrated circuit (ASIC), a field-programmable gate array (FPGA), or the like.

Input device 330 may include a device that permits a user to input information into client computing module 300, such as a keyboard (e.g., control keys 160, keypad 162, or control buttons 120 and 122), a mouse, a pen, a microphone (e.g., microphone 156 or 116), a remote control, a touch-screen display (e.g., display 118 or 158), etc. Output device 340 may include a device that outputs information to the user, such as a display (e.g., display 118 or 158), a printer, a speaker (e.g., speaker 114 or 154), etc.

Input device 330 and output device 340 may allow the user to activate a particular service or application, such as an application to browse venue and event information. Input device 330 and output device 340 may allow the user to receive and view a menu of options and select options from the menu. The menu may allow the user to select various functions or services associated with applications executed by client computing module 300. For example, the menu may allow the user to select an event and purchase tickets to that event.

Communication interface 350 may include any transceiver-like mechanism that enables client computing module 300 to communicate with other devices and/or systems. Communication interface 350 may include a wired and/or wireless transmitter and a wireless and/or wired receiver. Communications interface 350 may include a network interface card, e.g., Ethernet card, for wired communications or a wireless network interface (e.g., a WiFi, WiMAX, or HSDPA) card for wireless communications. Communication interface 350 may also include, for example, a USB port for communications over a cable, a Bluetooth wireless interface for communicating with Bluetooth devices, etc.

Memory 360 may include a random access memory (RAM) or another type of dynamic storage device that may store information and instructions, e.g., an application, for execution by processing logic 320; a read-only memory (ROM) device or another type of static storage device that may store static information and instructions for use by processing logic 320; and/or some other type of magnetic or optical recording medium and its corresponding drive, e.g., a hard disk drive (HDD), for storing information and/or instructions.

Memory 360 may include one or more applications 362 and one or more user profiles 364. In the case of base 102, for example, applications 362 may include an application for browsing and/or purchasing event tickets, such as movie tickets. User profile 364 may include billing information, billing address, home address, credit card information, movie preferences, venue preferences, geographic preferences, purchase history, etc. User profile 364 may include other information for embodiments disclosed herein to help a user select and purchase event tickets, for example. Base 102 may store more than one user profile, e.g., it may store a user profile for many different users, such as a different profile for each member of a family.

Client computing module 300 may perform certain operations, as described herein. Client computing module 300 may perform these operations in response to processing logic 320 executing software instructions contained in a computer-readable medium, such as memory 360. A computer-readable medium may be defined as a physical or logical memory device. The software instructions may be read into memory 360 from another computer-readable medium or from another device via communication interface 350. The software instructions contained in memory 360 may cause processing logic 320 to perform processes that are described herein.

Figure 4:
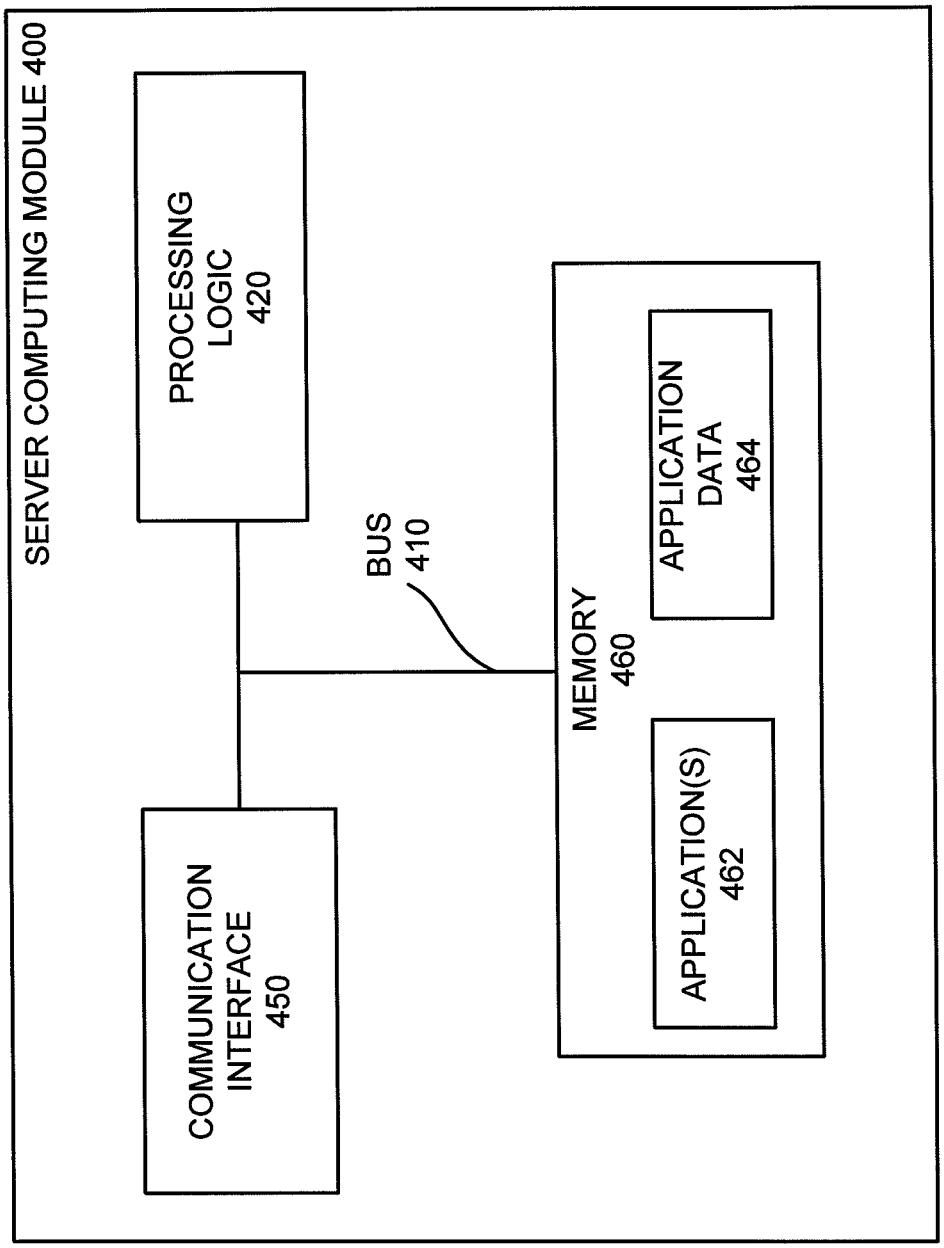
FIG. 4 is a block diagram of exemplary components of a server computing module.

FIG. 4 is a block diagram of exemplary components of a server computing module 400. Each of venue servers 206 and/or aggregation servers 204 may include one or more server computing modules 400 (e.g., a rack of server computing modules). Server computing module 400 may include a bus 410, processing logic 420, a communication interface 450, and a memory 460. Server computing module 400 may include other components (not shown) that aid in receiving, transmitting, and/or processing data. Moreover, other configurations of components in server computing module 400 are possible.

Bus 410 may include a path that permits communication among the components of server computing module 400. Processing logic 420 may include any type of processor or microprocessor (or groups of processors or microprocessors) that interprets and executes instructions. In other embodiments, processing logic 420 may include an ASIC, an FPGA, or the like.

Communication interface 450 may include any transceiver-like mechanism that enables server computing module 400 to communicate with other devices and/or systems. Communication interface 450 may include a wired and/or wireless transmitter and a wireless and/or wired receiver. Communications interface 350 may include a network interface card, e.g., Ethernet card, for wired communications or a wireless network interface (e.g., a WiFi, WiMAX, or HSDPA) card for wireless communications.

Memory 460 may include a RAM or another type of dynamic storage device that may store information and instructions for execution by processing logic 420; a ROM device or another type of static storage device that may store static information and instructions for use by processing logic 420; and/or some other type of magnetic or optical recording medium and its corresponding drive, e.g., a HDD, for storing information and/or instructions. Memory 460 may include one or more applications 462 and application data 464.

In the case of venue servers 206, applications 462 may include an application to store venue event information and send the event information to aggregation servers 204 (e.g., on a continuous or periodic basis). In this case, application data 464 may include information about venue events (e.g., event titles, descriptions, locations, ticket prices, seat information, etc). In the case of aggregation servers 204, applications 462 may include an application to receive (e.g., aggregate) event information from venue servers 206. Applications 462 may also include an application to receive requests for venue event information from user devices 202 and deliver the venue event information to user devices 202.

Server computing module 400 may perform certain operations, as described in detail herein. Server computing module 400 may perform these operations in response to processing logic 420 executing software instructions contained in a computer-readable medium, such as memory 460. The software instructions may be read into memory 460 from another computer-readable medium or from another device via communication interface 450. The software instructions contained in memory 460 may cause processing logic 420 to perform processes that are described herein.

Figure 5A:
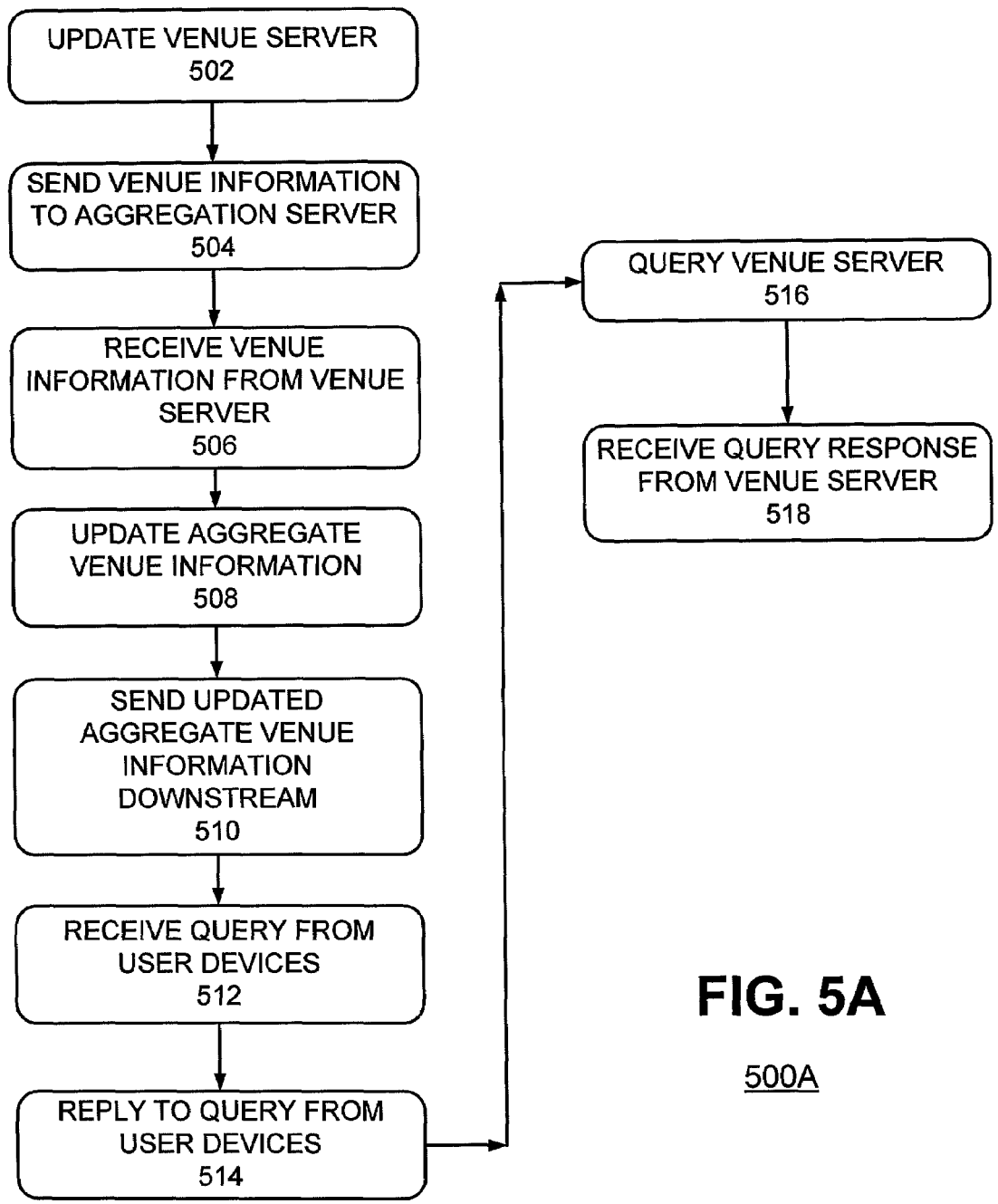
FIG. 5A is a flowchart of an exemplary process for aggregating venue information.

FIG. 5A is a flowchart of an exemplary process 500A for aggregating venue information. Process 500A may begin when an employee at a venue, such as a movie theater, determines the schedule of events, e.g., when different movies will be playing. A venue server may be updated (block 502). For example, venue server 206-1 may be updated with the details of events to occur at the stadium or arena. Venue servers 206-3 through 206-5 may be updated with the details of events (e.g., movie titles, show times, ticket prices, etc.) to occur at the different movie theaters.

Venue information may be sent to an aggregation server (block 504). For example, the venue information from venue server 206-1 may be sent to aggregation server 204-1. The venue information from venue servers 206-3 through 206-5 may be sent to aggregation servers 204-2. Venue information may be sent on a regular or periodic basis. For example, venue servers 206-3 through 206-5 may only send venue information to aggregation server 204-2 on a weekly basis for the following 10 days. In another embodiment, venue servers 206-x may send venue information whenever an aggregation server requests the venue information.

The venue information may be received by the aggregation server(s) (block 506). In the current example, aggregation server 204-1 may receive the venue information from venue server 206-1 (and possibly venue server 206-2). Aggregation server 204-2 may receive venue information from venue servers 206-3 through 206-5. Aggregate venue information may be updated (block 508). For example, aggregate server 204-1 may update its aggregate venue information stored in its memory 460 based on the received venue information. Aggregate server 204-2 may also update its aggregate venue information stored in its memory 460 based on the received venue information.

Aggregate venue information may be sent downstream (block 510). For example, aggregate server 204-1 may be considered downstream from aggregate server 204-2. In this example, when aggregate server 204-2 receives updated venue information it may send updated aggregate venue information downstream to aggregate server 204-1. Aggregate server 204-2 may receive the updated aggregate venue information and may update its own aggregate venue information stored in its memory 460.

Queries may be received from user devices (block 512). For example, aggregation server 204-1 may receive queries (e.g., requests) from user device 202-x. A query may be for a list of venues carrying a particular event (e.g., theaters showing a particular movie). A query may be for a list of events playing at a particular venue (e.g., movies playing at a particular movie theater). A query may also be limited by a time frame (e.g., events in the next week). A query may involve the availability of tickets for an event. A query may involve events or venues near a geographic location.

The aggregation server may respond to the query from the user devices (block 514). For example, aggregation server 204-1 may query the aggregate venue information stored in memory 460 and may respond to user device 202-x with the requested information. Aggregation server 204-1 may respond to the query based on the profile of the user currently using user device 202-x.

A user profile may include information about the user currently logged into user device 202-x. The information may include user preferences, billing information, and/or credit card information. For example, the user profile may include the ZIP code of the user. The user profile may include venues and events for which the user has previously purchased tickets or otherwise expressed an interest. The user may express an interest by, for example, adding a venue or an event to a list of venues or events of interest or by repeatedly selecting the event or venue even though not purchasing tickets. The user profile may include a list of preferences, likes, or dislikes, such as whether the user likes horror movies, whether the user likes baseball, whether the user dislikes basketball, whether the user dislikes western movies. These preferences may be derived from information gathered about the user (e.g., the user purchases tickets to baseball games often) or may be defined by the user himself.

As mentioned, aggregation server 204-1 may respond to a query based on the profile of the user currently using user device 202-x. For example, aggregation server 204-1 may provide a list of venues geographically close to user device 202-x. Aggregation server 204-1 may provide a list of events that reflect the preferences of the user of device 202-x as stored in the user profile. Aggregation server 204-1 may provide a list of events based on the venues the user recently visited. Aggregation server 204-1 may determine not to display events to which the user has already purchased tickets. Aggregation server 204-1 may determine to display movies in the user's favorite genre.

Venue servers may be queried (block 516). For example, aggregation server 204-1 may receive a query, from user device 202-x, regarding the availability of tickets for a particular event at a particular time at a particular venue. Before responding to user device 202-x, aggregation server 204-1 may first have to query the appropriate venue server 206-x because aggregation server 204-1 may not have current or accurate information. A response to the query may be received (block 518). For example, aggregation server 204-1 may receive a response to a query from the appropriate venue server 206-1 and may be able to respond to user device 202-x.

Figure 5B:
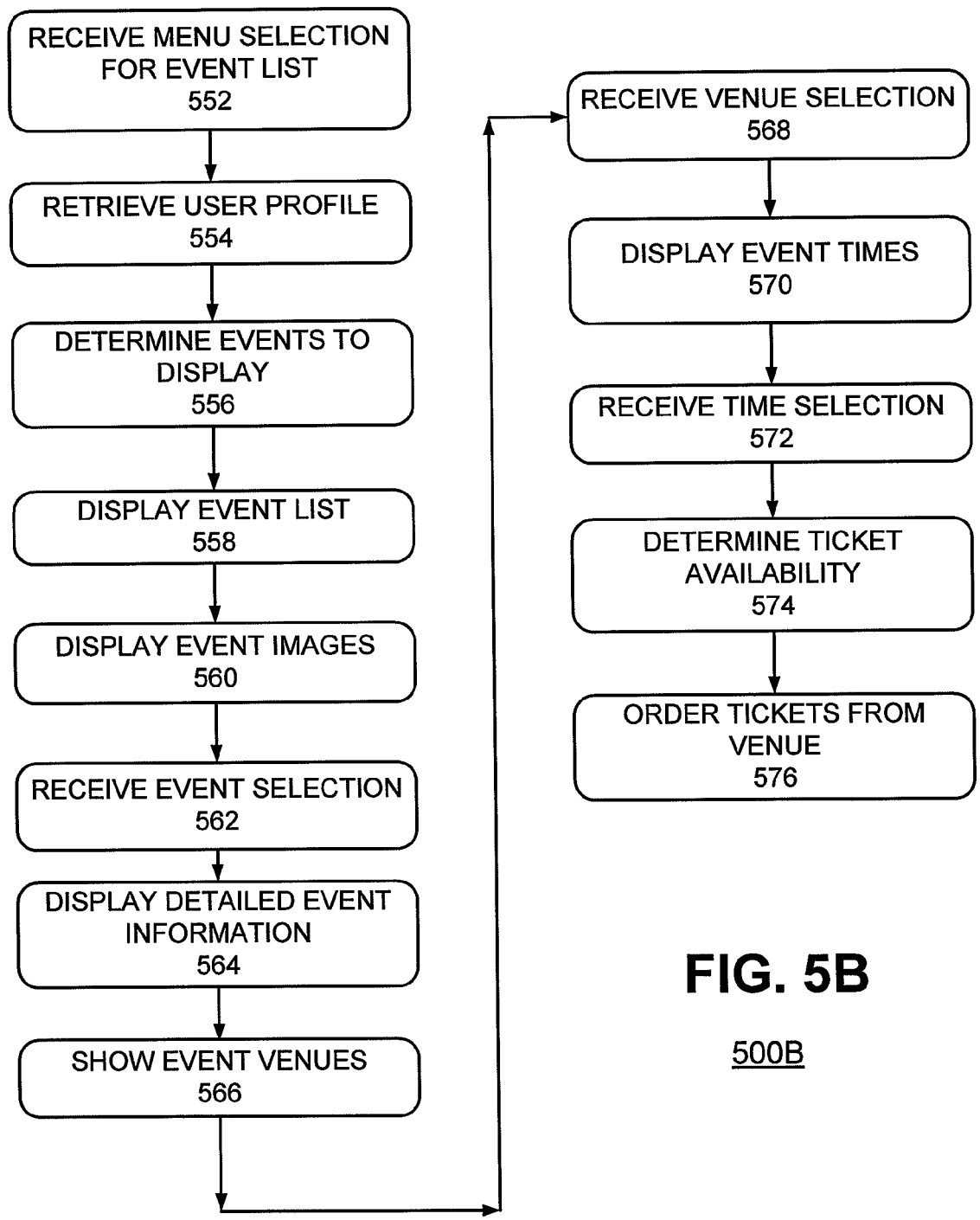
FIG. 5B is a flowchart of an exemplary process for browsing and purchasing tickets from a list of events.

FIG. 5B is a flowchart of an exemplary process 500B for purchasing tickets from a list of events. FIG. 5B is described with respect to FIGS. 6A-6D, 7A-7F, and 8A-8D, which are diagrams of graphical user interfaces (e.g., screens) that may be shown on display 118 of user device 100, for example. For simplicity, process 500B is described below with respect to user device 202-4.

Figure 6A:
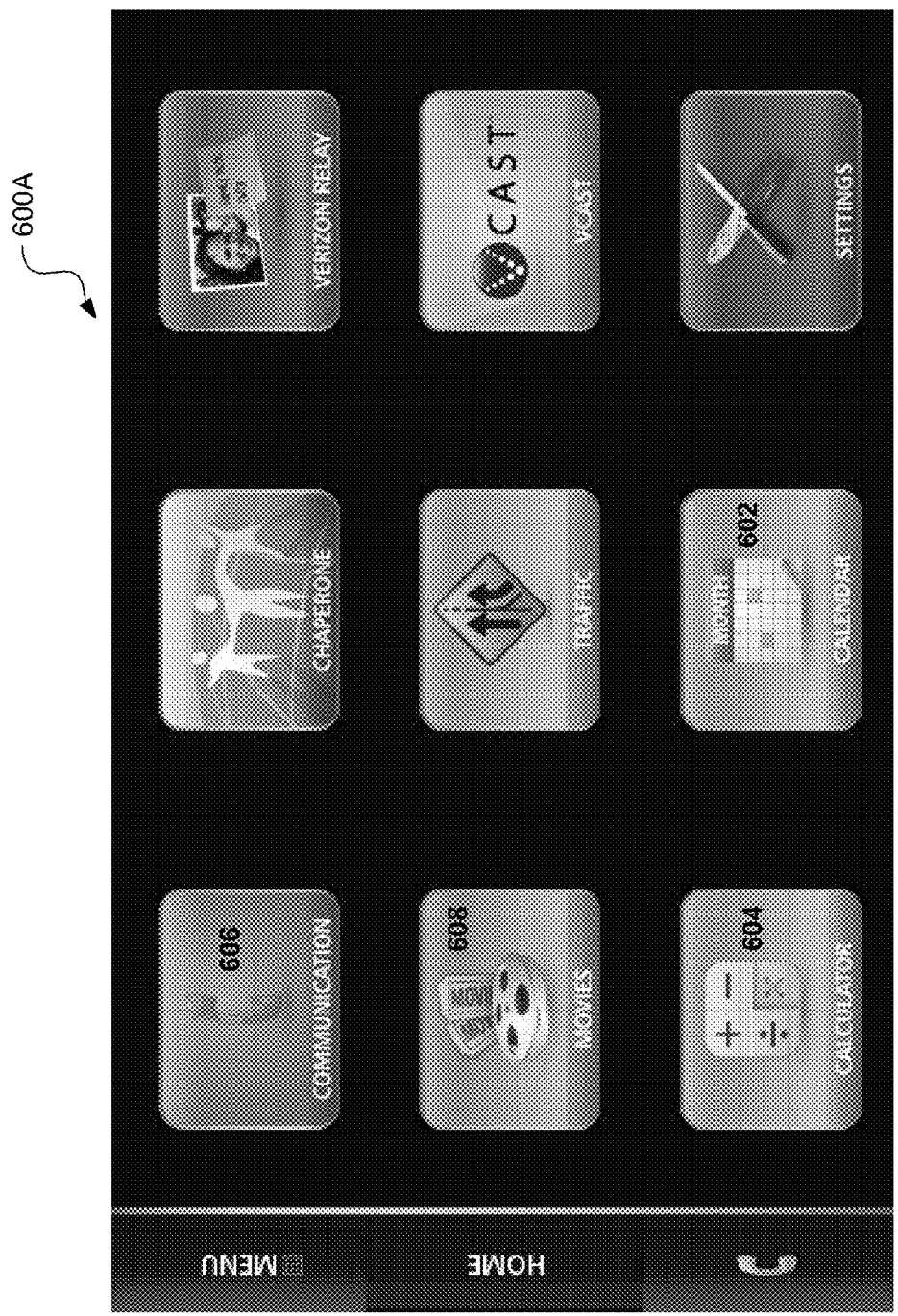
FIGS. 6A-6D, 7A-7F, and 8A-8D are block diagrams of exemplary graphical user interfaces for browsing and purchasing tickets from a list of events.

Process 500B may begin when a user of device 202-4 activates a particular function by, for example, touching display 118. For example, user device 202-4 may display a screen 600A as shown in FIG. 6A on display 118. A user may select among various functions offered by user device 100. For example, a user could touch a CALENDAR icon 602 for a calendar function, a CALCULATOR icon 604 for a calculator function, a COMMUNICATION icon 606 for a calling function, or a MOVIES icon 608 for a list of movies. As shown, other icons for additional functionality may be displayed on screen 600A. In this example, icon 608 is labeled MOVIES, but any type of events may be associated with icon 608 (e.g., sporting events, theater events, etc.). For simplicity, the description of process 500B is described with respect to movie events, but any type of event is possible.

A menu selection for a list of events may be received (block 552). For example, a user may touch MOVIE icon 608 in menu 600A, which may indicate a request by the user for a list of events. The received request for the list of events may be transmitted (e.g., as a query) to an aggregation server, such as aggregation server 204-1. A user profile may be retrieved (block 554). The aggregation server, such as aggregation server 204-1, may retrieve the user profile associated the user currently logged into user device 202-4. The user profile may be stored in memory 360 of user device 202-4. In this embodiment, the user may log into user device 202-4 so that, for example, multiple profiles for multiple different users may be stored in user device 202-4. In another embodiment, the user profile may be stored in memory 460 of aggregation server 204-1 or aggregation server 204-2.

In yet another embodiment, the events in list 612 may be listed in an order based on a preference set by the user (e.g., list of movies matching a favorite genre, a list of movies by geographic distance, a list of movies alphabetically, etc.). The user may specify or select the order events are displayed.

A list of events to display may be determined (block 556). Aggregation server 204-1 may determine, based on the profile, the events (e.g., movies) to display to the user of user device 202-4. For example, the user profile may include a home ZIP code, the venues previously visited by the user, ticket purchase history, the user's favorite genre of movies, etc. In one embodiment, aggregation server 204-1 may determine to display events geographically close (e.g., based on the ZIP code) to user device 202-4. Aggregation server 204-1 may determine to display events based on the venues the user recently visited. Aggregation server 204-1 may determine not to display events to which the user has already purchased tickets. Aggregation server 204-1 may determine to display movies in the user's favorite genre. In another embodiment, user device 202-4 may make the determination of which events to display.

Figure 6B:
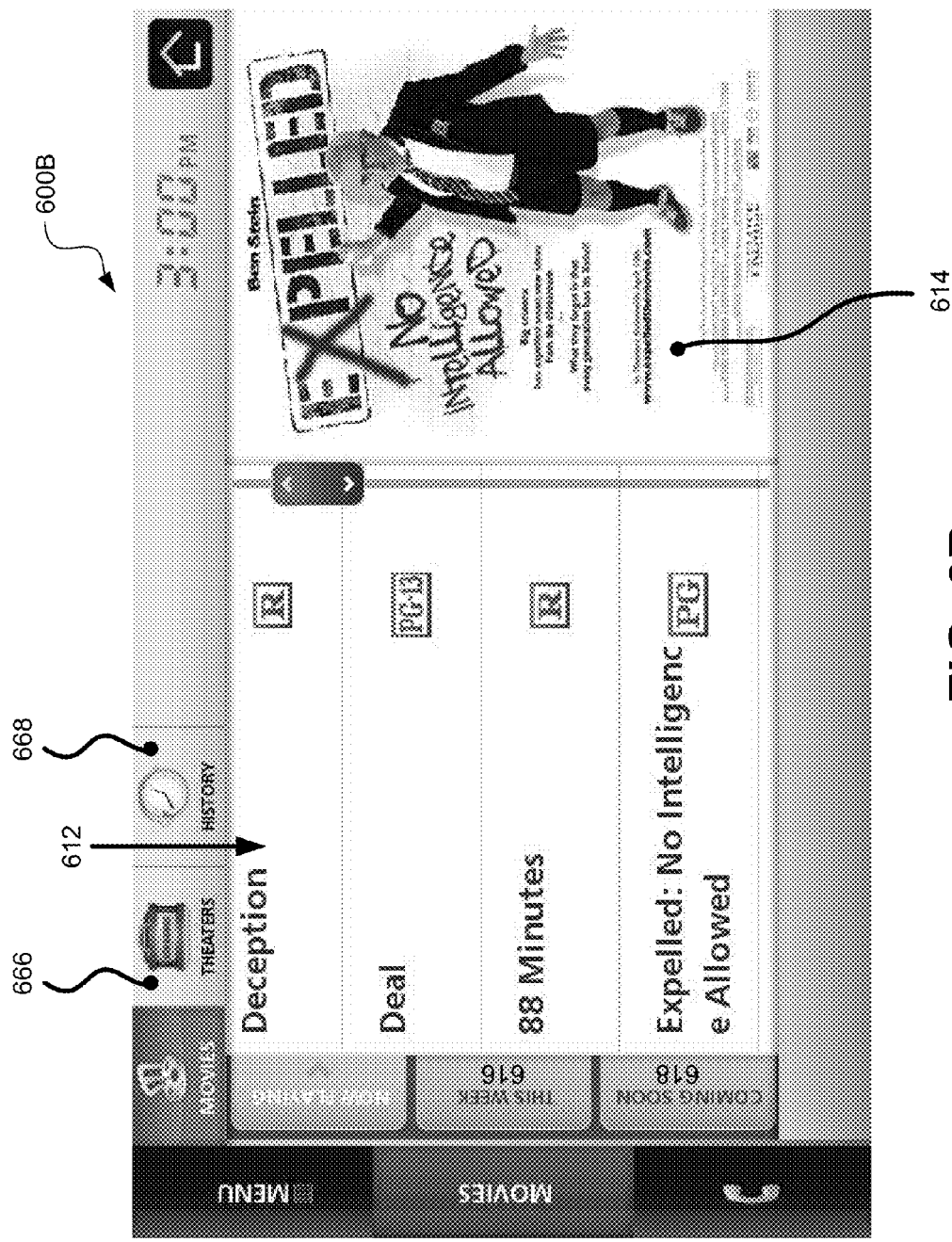
Figure 6C:
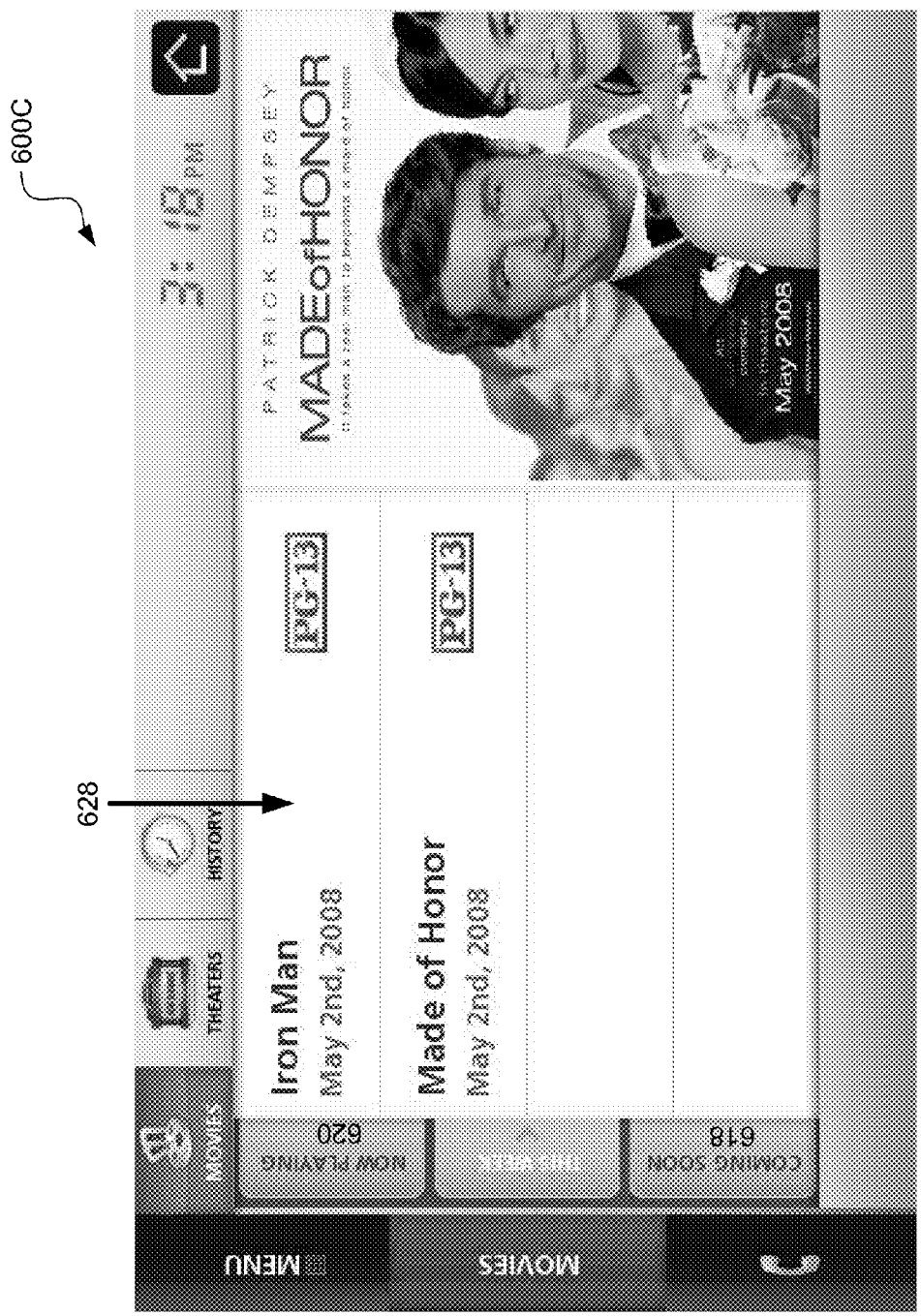
Figure 6D:

A list of events may be displayed (block 558). Aggregation server 204-1 may send a list of the events that it determined to display to user device 202-4. As shown in FIG. 6B, user device 202-4 may display a screen 600B including a list of events 612, which may have been received from aggregation server 204-1. List 612 may include a list of movies 612 currently playing including, for example, "Deception," "Deal," "88 Minutes," and "Expelled: No Intelligence Allowed." The user may scroll through list 612 if, for example, there are too many events to list on display 118 at once. In one embodiment, the events in list 612 are listed in the order of release date. In another embodiment, the events in list 612 are listed in alphabetical order.

Event images may also be displayed (block 560). User device 202-4 may receive, from aggregation server 204-1, images associated with list 612 of events, for example. As shown in FIG. 6B, screen 600B may include an image 614 associated with one or more of the events in list 612. As shown on screen 600B, image 614 is associated with the event "Expelled: No Intelligence Allowed" from list 612. In this example, the images may include images of posters associated with the movies. In other embodiments, the images may include sporting team logos for sporting events. In yet another embodiment, event videos (e.g., a trailer) may be displayed as well as or instead of images.

In one embodiment, user device 202-4 may cycle through images associated with different events in list 612 in a random (e.g., pseudo-random) order or in a predetermined order. Thus, the user may view all of the images associated with the events over a period of time. In one embodiment, user device 202-4 may display only one image at a time on display 118. In this embodiment, a small viewing area may be used more effectively to display detailed images, rather than fitting multiple images onto a small viewing area. In other embodiments, more than one image may be displayed.

Events may be listed in different ways. For example, a user may touch a THIS WEEK tab 616 on screen 600B. User device 202-4 may show an event list 628, as shown on a screen 600C in FIG. 6C. User device 202-4 may receive list 628 in response to a query to aggregation server 204-1. Events in list 628 may include only events that are scheduled to take place within the following week, for example. The events selected for list 628, like the events selected for list 612, may also be selected based on the profile of the current user of device 202-4. As shown on screen 600C, user device 202-4 may display an image associated with one or more of the events in list 628. In one embodiment, user device 202-4 may cycle through images associated with different events in list 628 in a random order or in a predetermined order.

As another example, a user may touch a COMING SOON tab 618 on screen 600B or screen 600C. User device 202-4 may show an event list 638, as shown on a screen 600D in FIG. 6D. In one embodiment, user device 202-4 may receive list 638 in response to a query to aggregation server 204-1. In one embodiment, events in list 638 may include only events that will take place in the future, but have not been scheduled (e.g., a movie that has not been released yet), or has been scheduled but has not opened yet (e.g., a movie before its opening night). The events selected for list 638, like the events in list 612 and 628, may also be selected based on the profile of the current user of device 202-4. As shown on screen 600D, user device 202-4 may display an image associated with one or more of the events in list 638. In one embodiment, user device 202-4 may cycle through images associated with different events in list 618 in a random order or in a predetermined order. When the user is shown event list 638 or event list 628, the user may touch a NOW PLAYING tab 620, for example, to return to event list 612 on screen 600B.

Figure 7A:
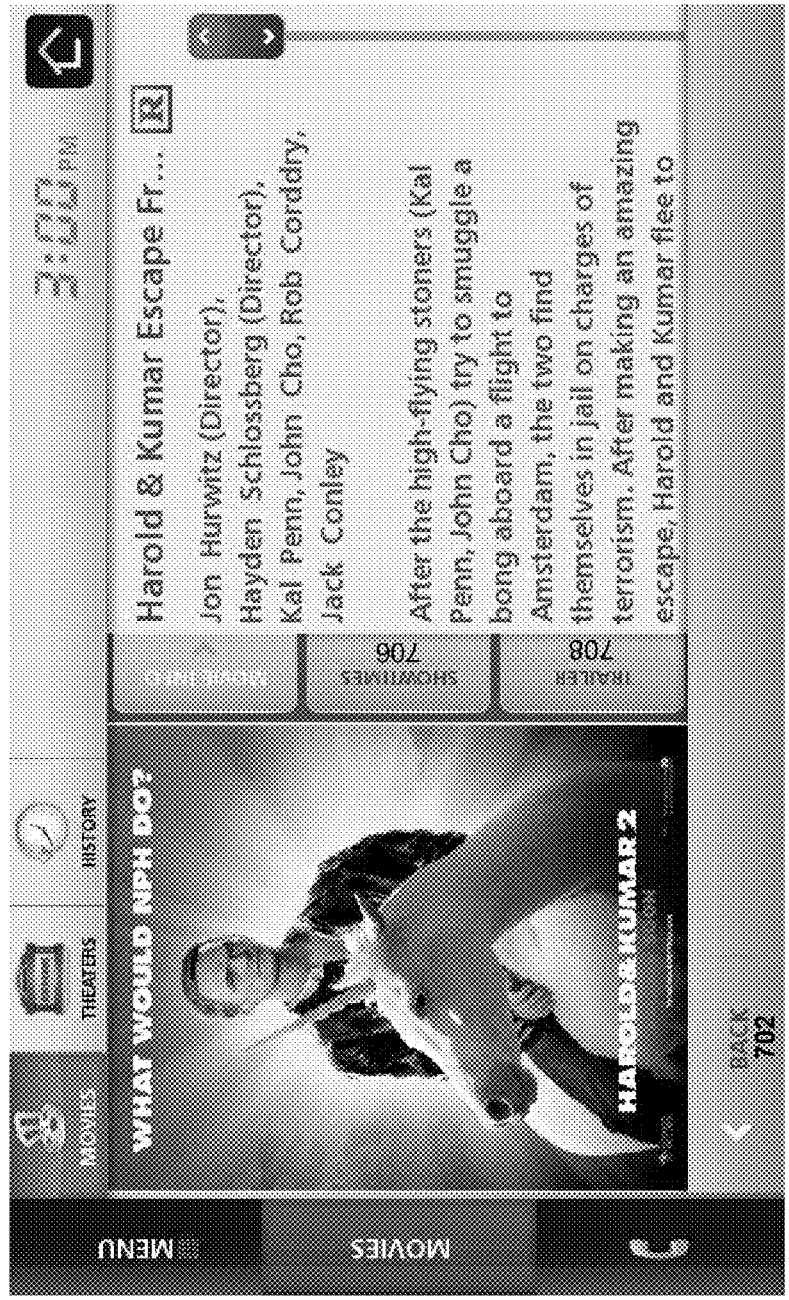
Figure 7B:
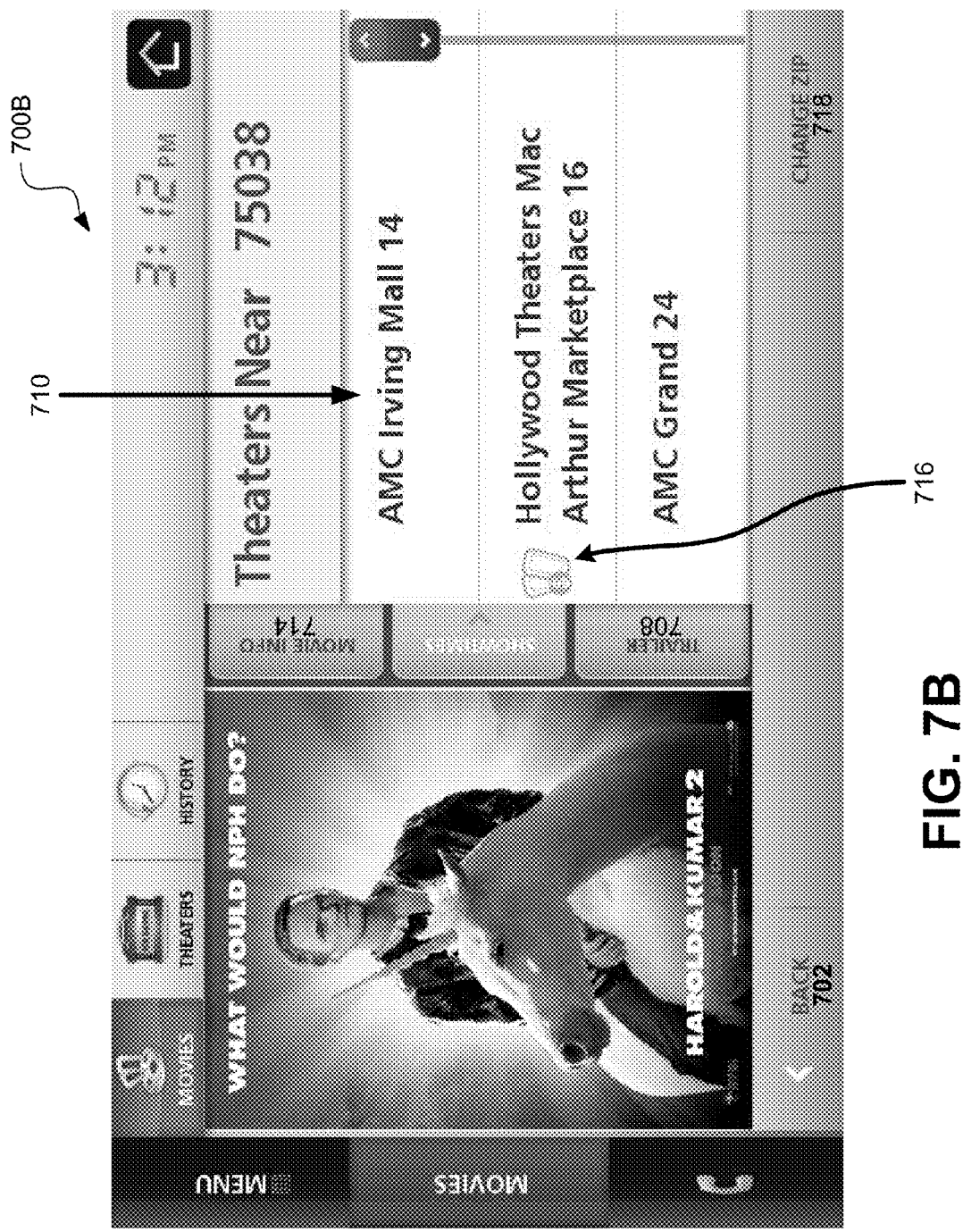
Figure 7C:
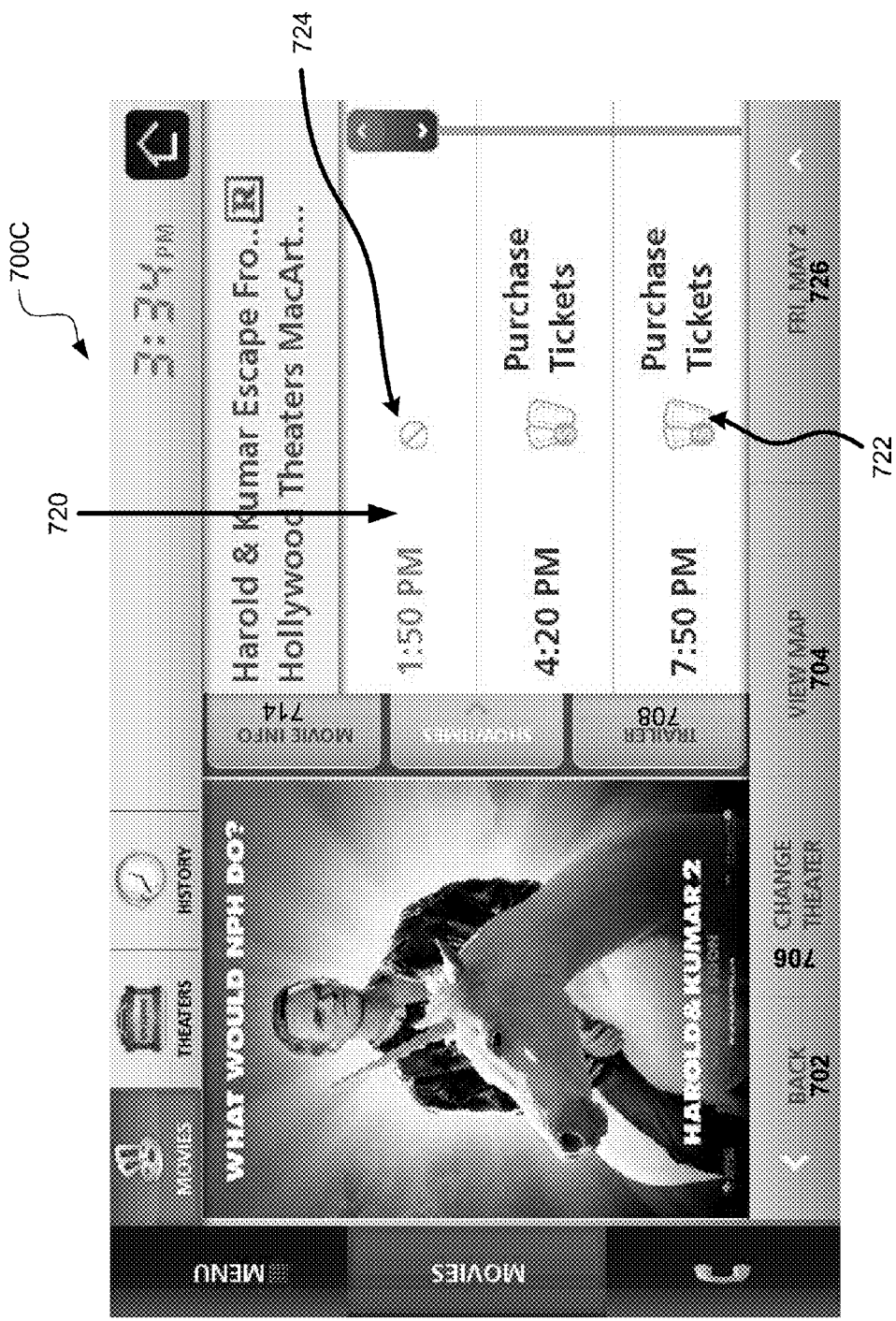
Figure 7D:
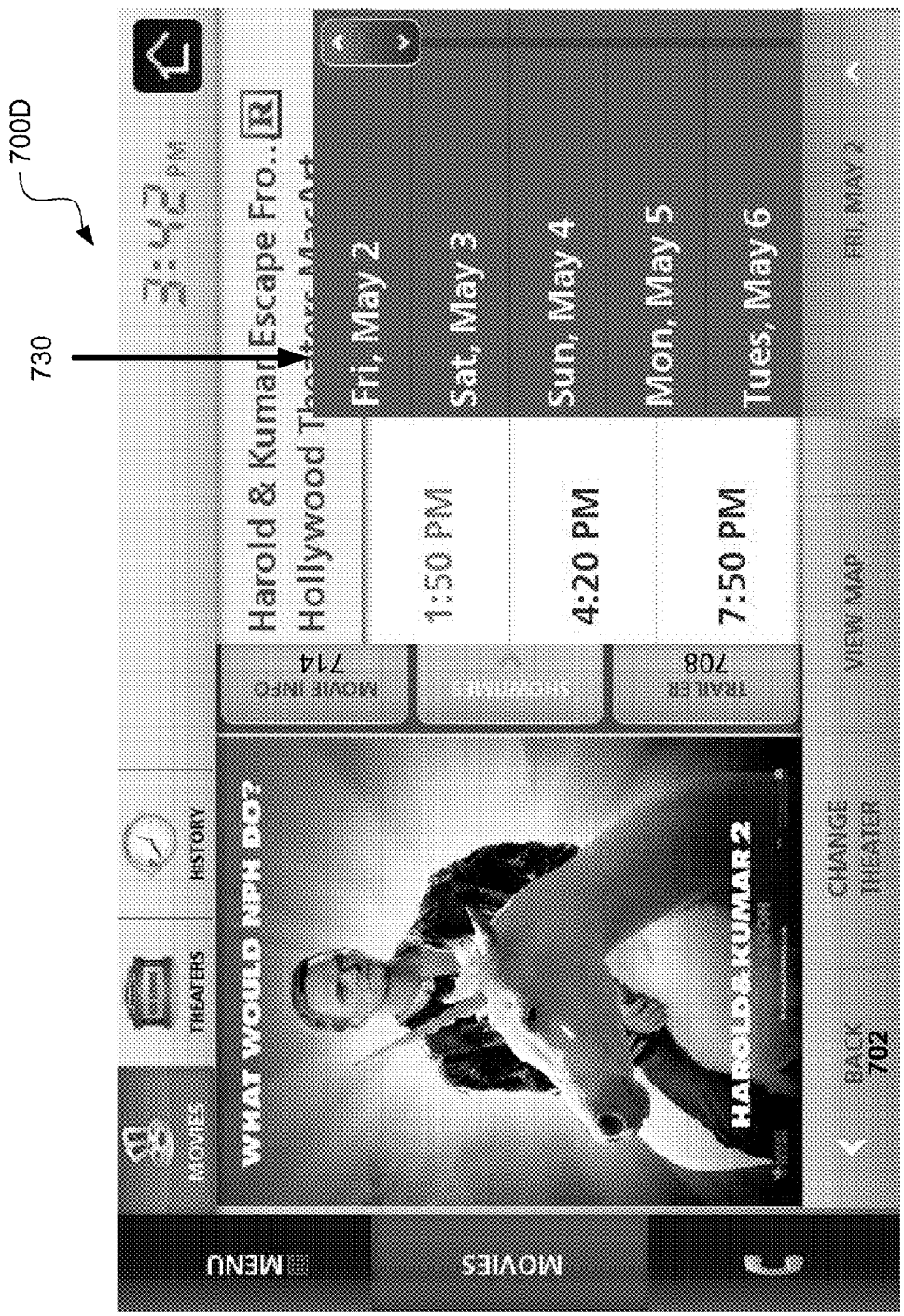
Figure 7E:
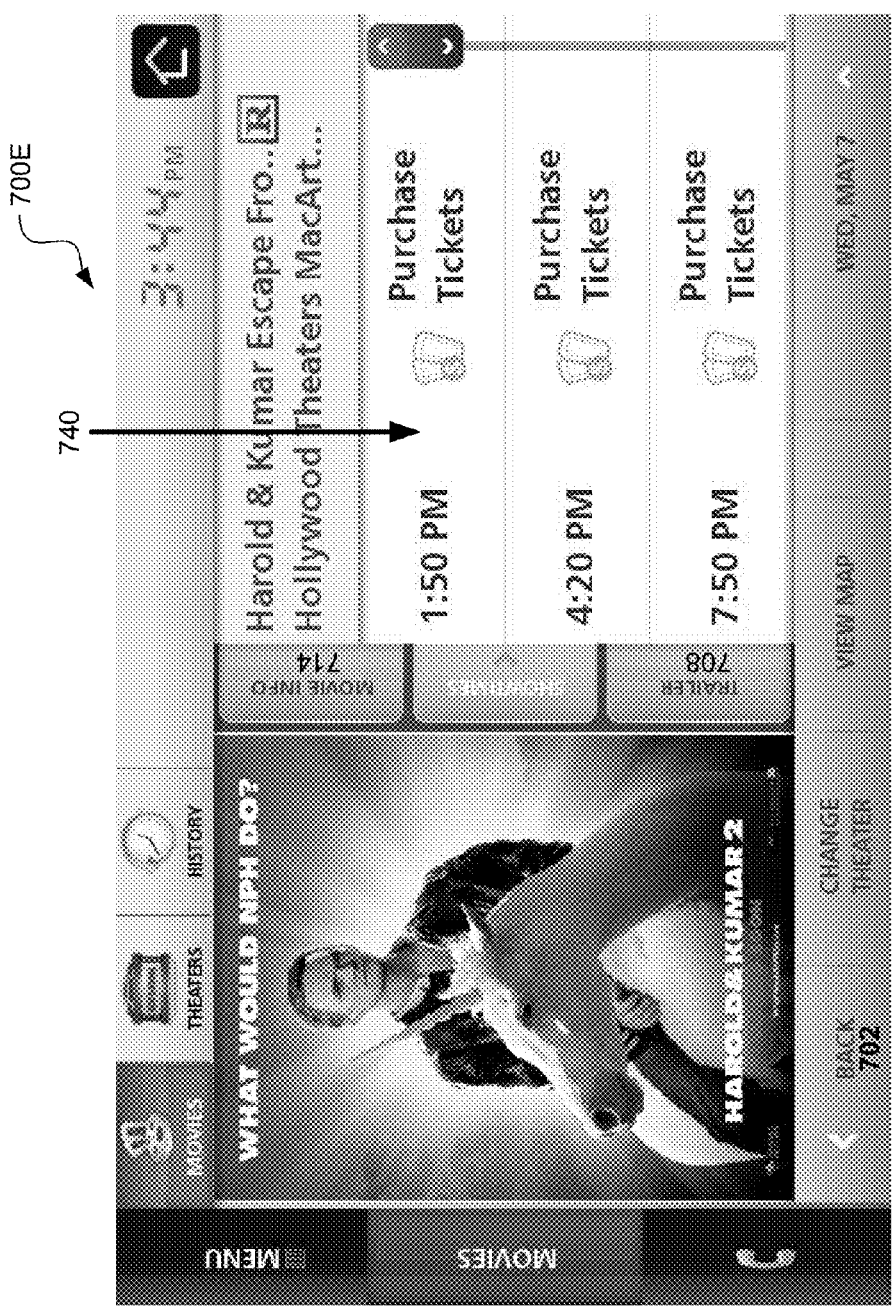
Figure 7F:
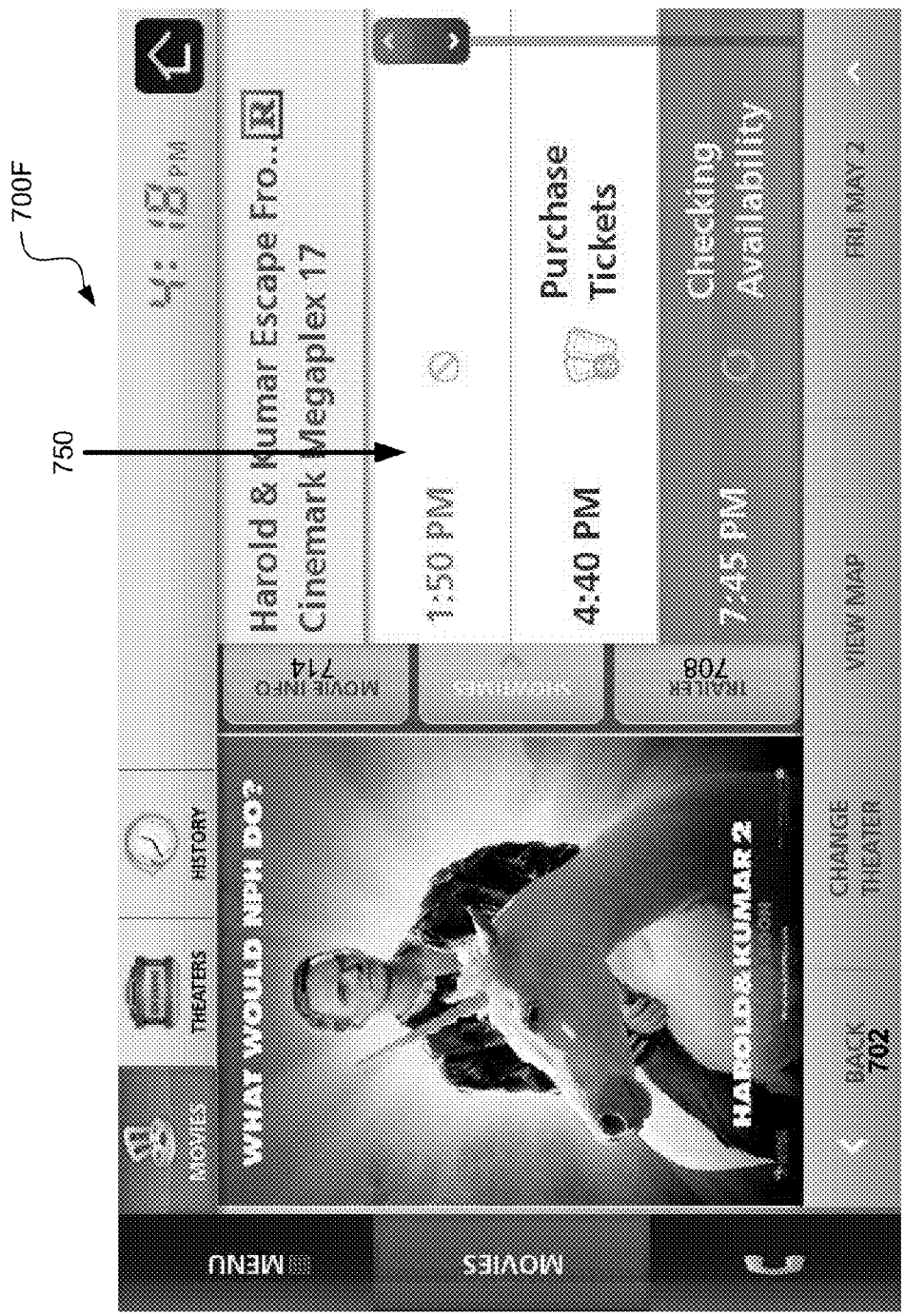

A user selection of an event may be received (block 562). The user of user device 202-4 may select one of the events in one of the lists by, for example, touching one of the entries in the list (e.g., in list 612) or by selecting the associated image. Detailed information for the selected event may be displayed (block 564). As shown in FIG. 7A, user device 202-4 may display a screen 700A, which may include details related to the event selected by the user. For example, screen 700A may display a synopsis for the event "Harold & Kumar," including the name of the directors and actors and an image of a poster (or a video of a trailer) associated with the event. In one embodiment, user device 202-4 may receive the details of the selected event in response to a query to aggregation server 204-1. As shown on screen 700A, a user may touch BACK button 702 to return to the previous list of events, such as one of lists 612, 628, or 638 on screens 600B, 600C, or 600D, respectively.

Event venues may be displayed (block 566). For example, a user may touch SHOWTIMES tab 706 as shown on screen 700A. User device 202-4 may display a list of venues 710, as shown on a screen 700B in FIG. 7B, that are host to the selected event. In one embodiment, user device 202-4 may display venues geographically close to user device 202-4 (e.g., near ZIP code 75038). In one embodiment, user device 202-4 may receive list 710 in response to a query to aggregation server 204-1. A user may select a venue, for example, by touching a venue in list 710. Whether a user can purchase tickets through user device 202-4 may be indicated by a ticket icon 716 next to the name of the venue. If the user wishes to view the trailer to the movie, the user may touch TRAILER tab 708. The user may change the ZIP code on which list 710 is based on by touching CHANGE ZIP button 718.

Event venue selection may be received (block 568). For example, a user may select the venue "Hollywood Theaters Mac Arthur Marketplace 16" from screen 700B (which includes ticket icon 716). Event times may be displayed (block 570). In response to the user selection, user device 202-4 may display a list of event times 720, as shown on a screen 700C in FIG. 7C. In one embodiment, user device 202-4 may receive list 720 in response to a query to aggregation server 204-1. The user may view a map of the selected location by touching VIEW MAP button 704, for example. The user may change the venue selection by pressing CHANGE THEATER button 706, for example. To return to the event information screen 700A, the user may touch MOVIE INFO tab 714.

On screen 700C, a ticket icon 722 may indicate event times at which the user may still purchase a ticket. An unavailable icon 724 may indicate event times no longer available for ticket purchase (e.g., too late or sold out). To change the date of the list of show times, for example, the user may touch date button 726. In response, user device 202-4 may display a list of dates 730, as shown on a screen 700D in FIG. 7D. The user may select a date in the future (e.g., May 7) and, in response, user device 202-4 may display a list of show times 740 (e.g., for May 7) on a screen 700E in FIG. 7E.

From screen 700E, a user may touch BACK button 702 to return to screen 700B and may touch BACK button 702 again to return to screen 700C. The user may then select a different theater, if the user so desires. For example, the user may scroll list 710 on screen 700B to select the theater "Cinemark Megaplex 17" (not shown). In response, user device 202-4 may display a screen 700F in FIG. 7F, including a list of show times 750 for the newly selected theater. The time selection may be received (block 572). For example, the user may touch a show time listing on screen 700F to request the availability of tickets and/or purchase tickets for the event at that time.

Ticket availability may be determined (block 574). For example, assume that the user touched the show time of 7:45 PM on screen 700F to check the availability of tickets for that show time. The selection may be received by user device 202-4 and transmitted to aggregation server 204-x. Aggregation server 204-x may query the appropriate venue server 206-x to determine if there are any available tickets for the selected event at the selected time.

Figure 8A:
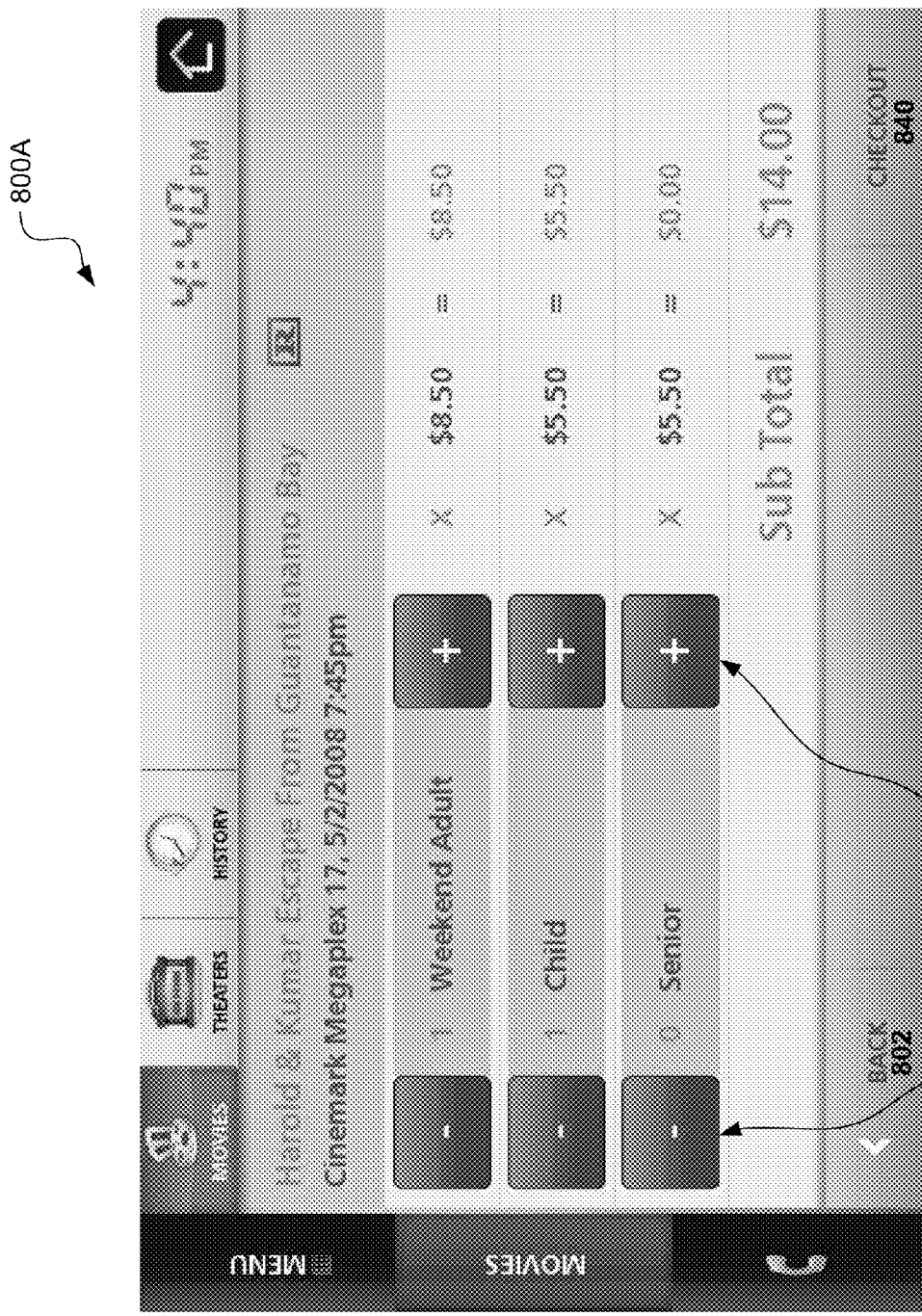

Tickets may be ordered for the selected event, venue, and/or time (block 576). If tickets are available, the user may be presented with a screen 800A as shown in FIG. 8A. Screen 800A indicates that tickets are available for "Harold & Kumar Escape From Guantanamo Bay" (the selected movie) at the Cinemark Megaplex 17" (the selected venue) at 7:45 pm on May 2, 2008 (the selected time). A user may touch PLUS icons 822 to increase the number of tickets for purchase or MINUS icons 824 to reduce the number of tickets for purchase. The user may touch BACK button 802 to return to screen 700F.

Figure 8B:
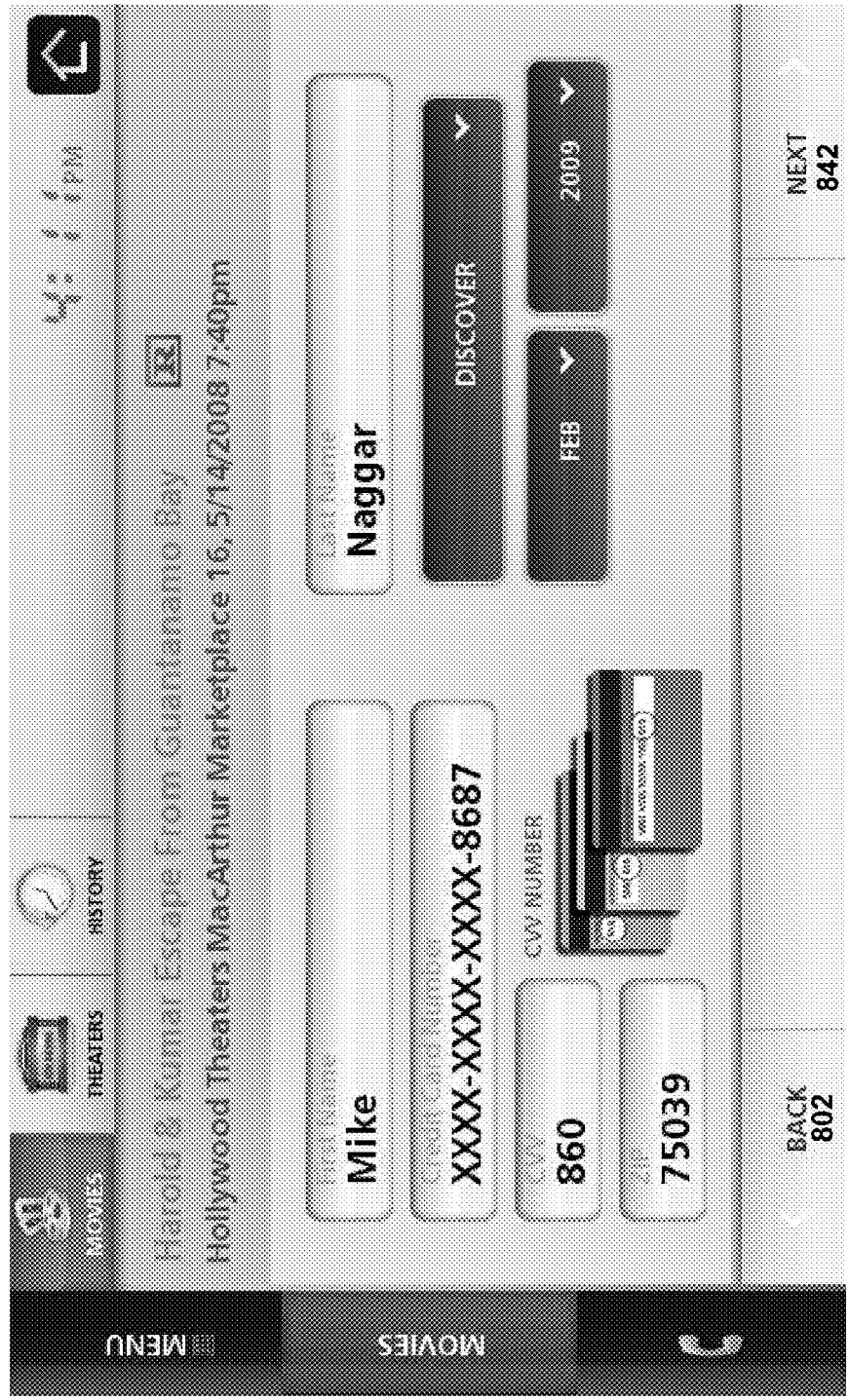
Figure 8C:
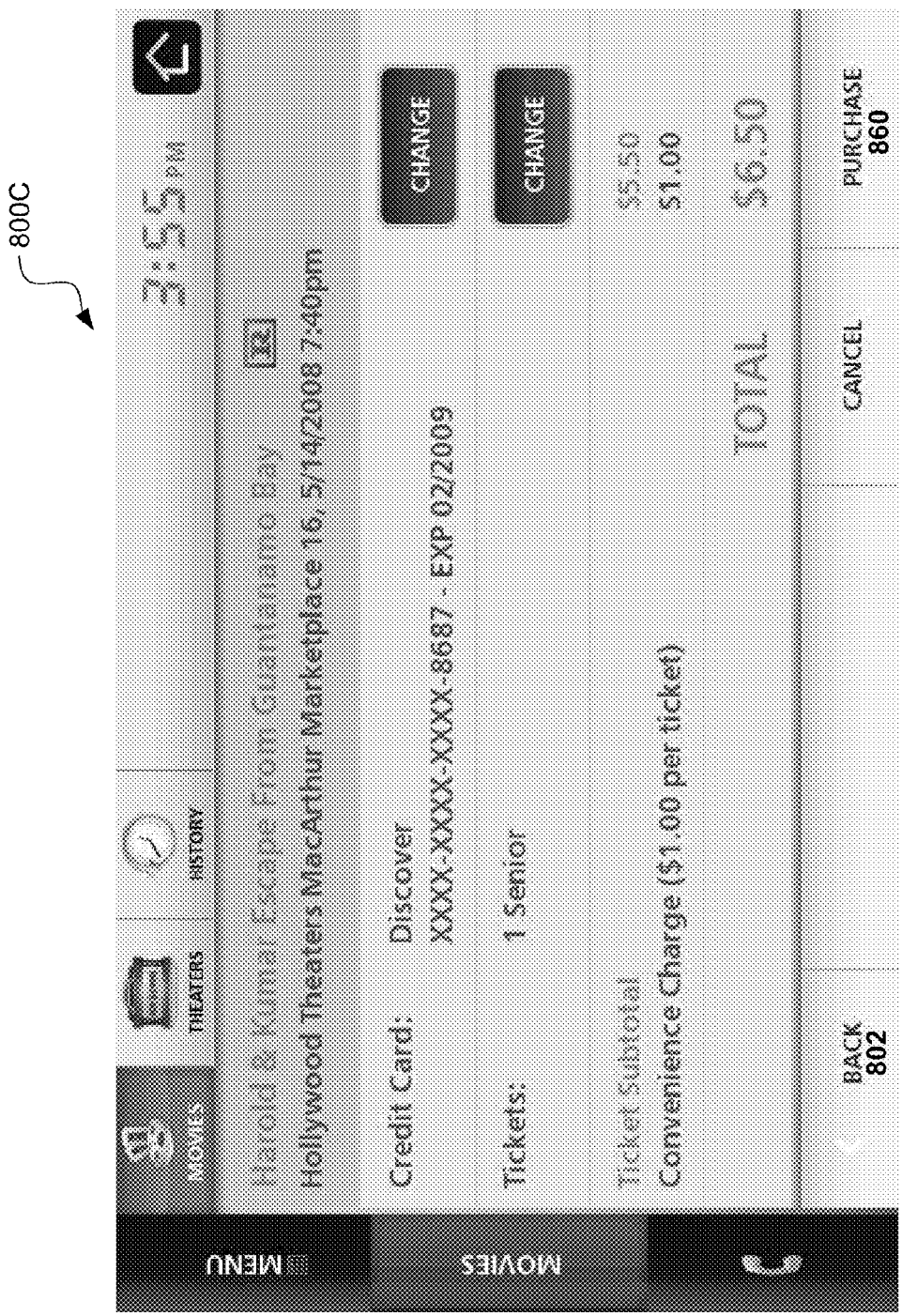
Figure 8D:
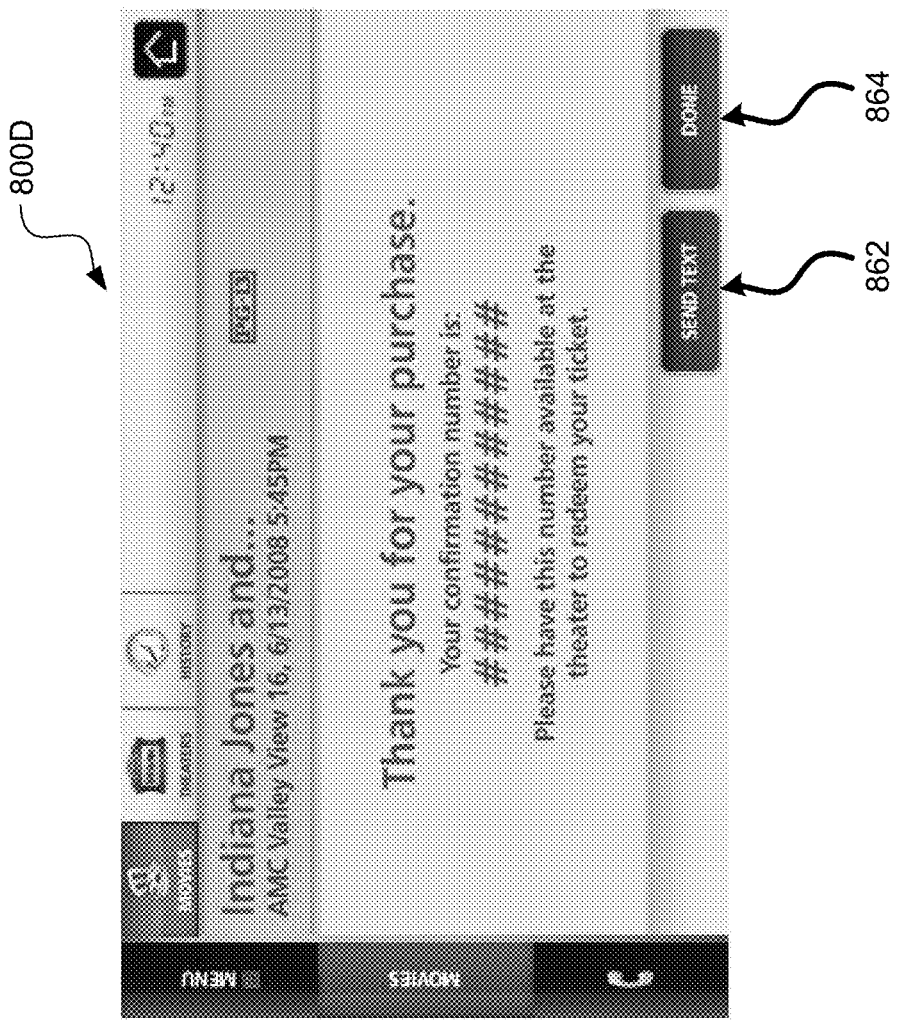

If the user touches CHECKOUT button 840 on screen 800A, then screen 800B of FIG. 8B may be shown. Screen 800B may show the total cost of the tickets for purchase. Screen 800B may include fields for the user's name, credit card number, etc., for purchasing the tickets. In one embodiment, the user's name, credit card number, etc. (e.g. payment information) may be stored in the user's profile. In the embodiment where the user profile is stored in user device 202-4, the payment information may be stored in user device 202-4 and user device 202-4 may automatically fill in the user payment information. In another embodiment, the payment information may be stored in aggregation server 204-1. If the user is satisfied with the payment information, the user may touch NEXT button 842 to advance to a purchase summary screen 800C of FIG. 8C. If the user is satisfied with the purchase summary screen 800C, the user may touch a PURCHASE button 860 to finalize the purchase of the tickets. User device 202-4 may display a purchase confirmation screen 800D, as shown in FIG. 8D, which may include, for example, a confirmation number. From screen 800D, the user may touch a SEND TEXT button 862 to have the confirmation number sent to a mobile device, e.g., as a text message, or to any other device (e.g., an automobile). In another embodiment, the confirmation number may be sent in an email, a multi-media message, etc. After purchase of tickets, aggregation server 204-1 may update the user profile associated with the purchase to include the details of the purchase.

Figure 9:
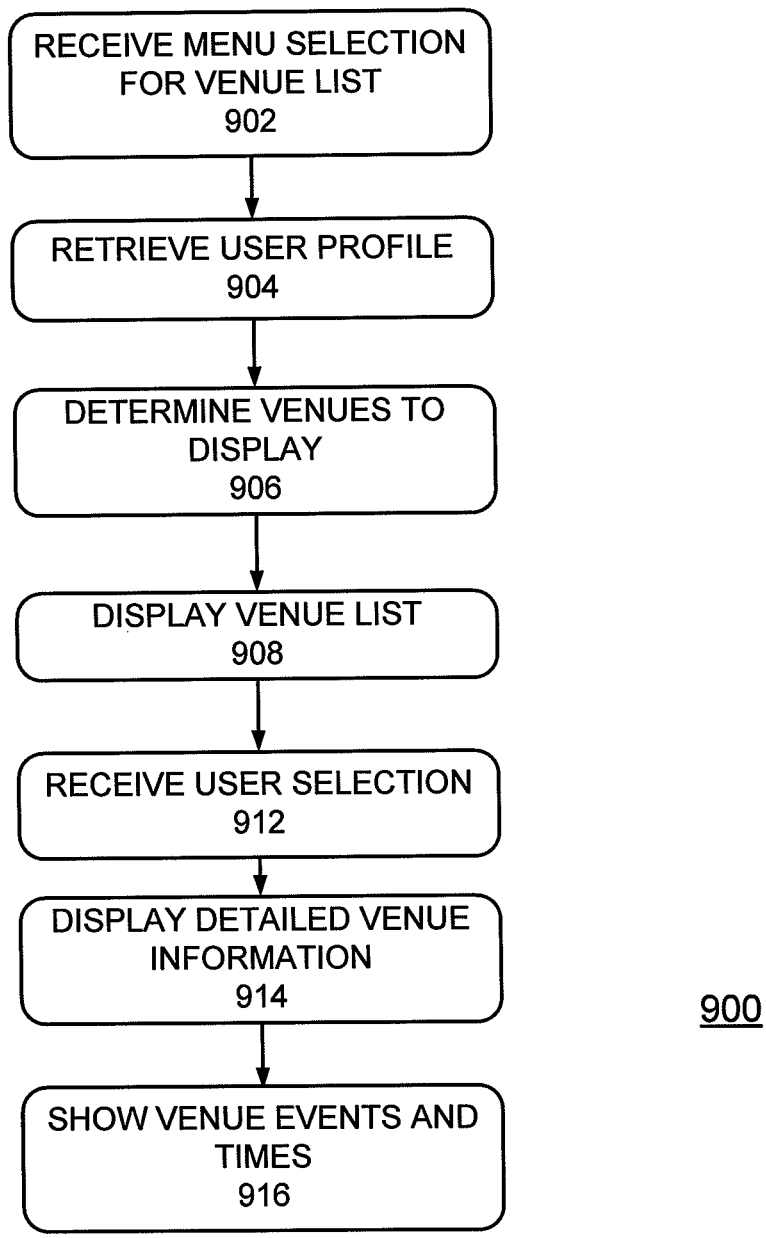
FIG. 9 is a block diagram of a flowchart for an exemplary process for browsing a list of venues and corresponding events.

Rather than select from a list of events (e.g., movies), a user may wish instead to select from a list of venues (e.g., movie theaters). Although the following exemplary embodiment is described with respect to movie theaters, any type of venue is possible (e.g., sporting venues). FIG. 9 is a block diagram of a flowchart for an exemplary process for purchasing tickets from a list of venues. FIG. 9 is described with respect to FIGS. 10A-10C, which are diagrams of graphical user interfaces (e.g., menus or screens) that may be displayed on display 118 of user device 100, for example. The following exemplary embodiment of process 900 is described with respect to user device 202-4.

Process 900 may begin when a user of device 202-4 activates a particular function by, for example, touching display 118. A menu selection for a list of venues may be received (block 902). For example, the user may touch a THEATERS icon 666 on screen 600B as shown in FIG. 6B, which may indicate a request by the user for a list of venues. In one embodiment, the user may touch a MENU button, then a MOVIES button, before touching THEATERS icon 666. A user profile may be retrieved (block 904). An aggregation server, such as aggregation server 204-1, may retrieve the user profile associated the user currently logged into user device 202-4. In one embodiment, the user profile may be stored in memory 360 of user device 202-4. In another embodiment, the user profile may be stored in memory 460 of aggregation server 204-1 or aggregation server 204-2.

A list of venues to display may be determined (block 906). Aggregation server 204-1 may determine, based on the user profile, what venues (e.g., movie theaters) to display to the user of user device 202-4. In one embodiment, aggregation server 204-1 may determine to display venues geographically close (e.g., based on the ZIP code) to user device 202-4. Aggregation server 204-1 may determine to display venues based on the venues the user recently visited. Aggregation server 204-1 may determine to display the user's favorite venues. Aggregation server 204 may send the list of venues to user device 202-4 for display to the user. In another embodiment, user device 202-4 (e.g., processing logic 320) may make the determination of which venues to display.

Figure 10A:
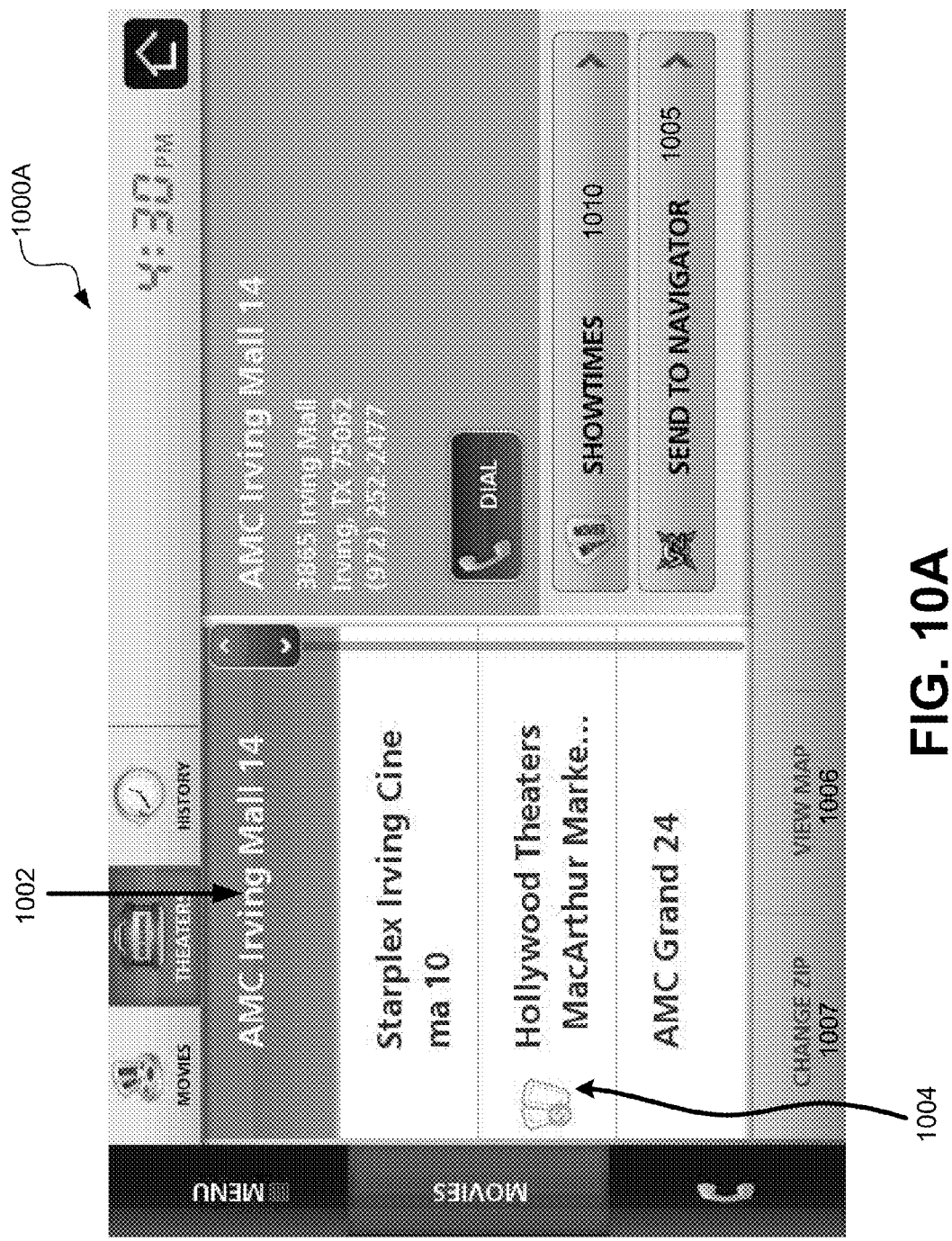
FIGS. 10A-10C and 11 are block diagrams of exemplary graphical user interfaces for browsing a list of venues and corresponding events.
Figure 10B:
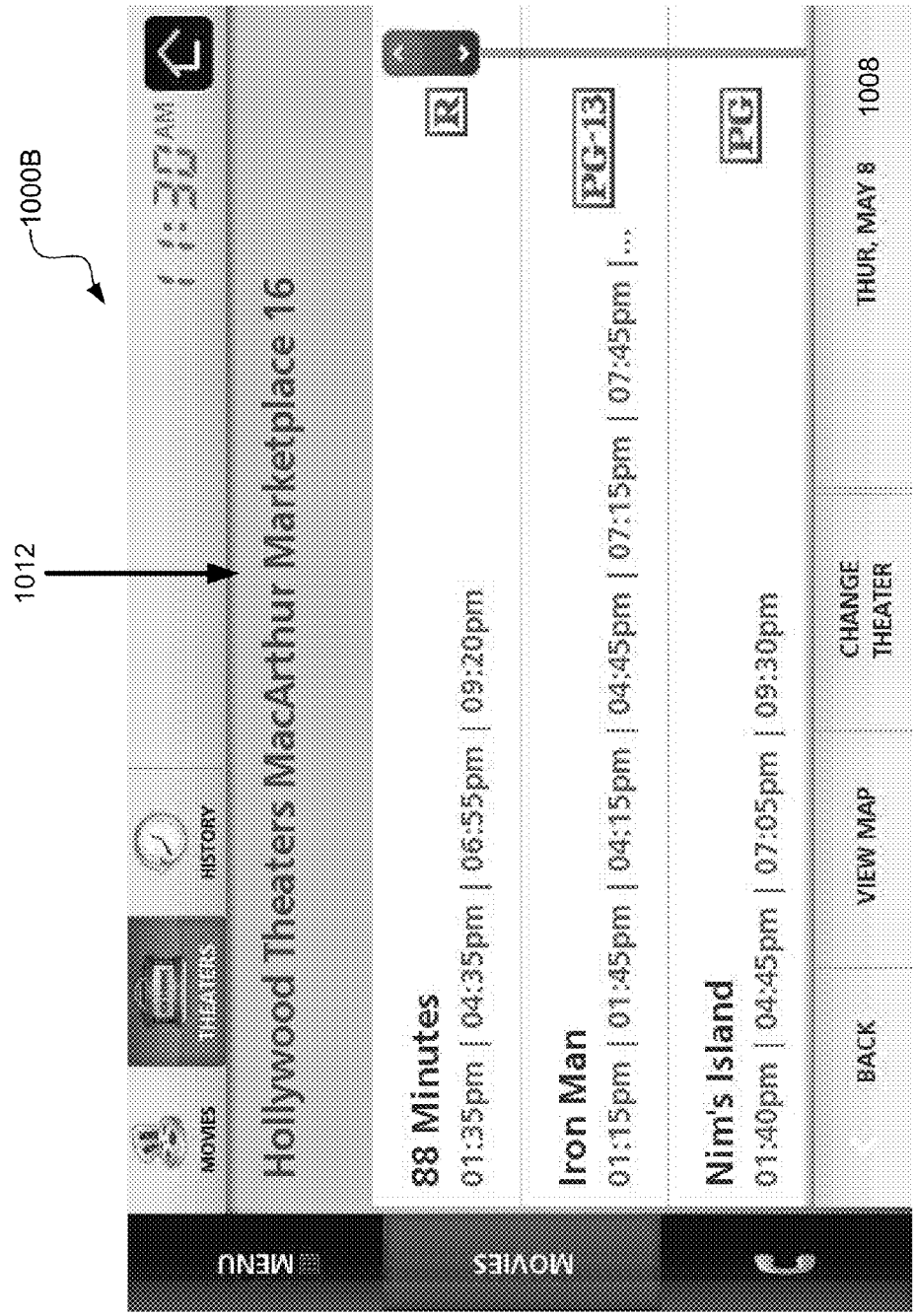
Figure 10C:
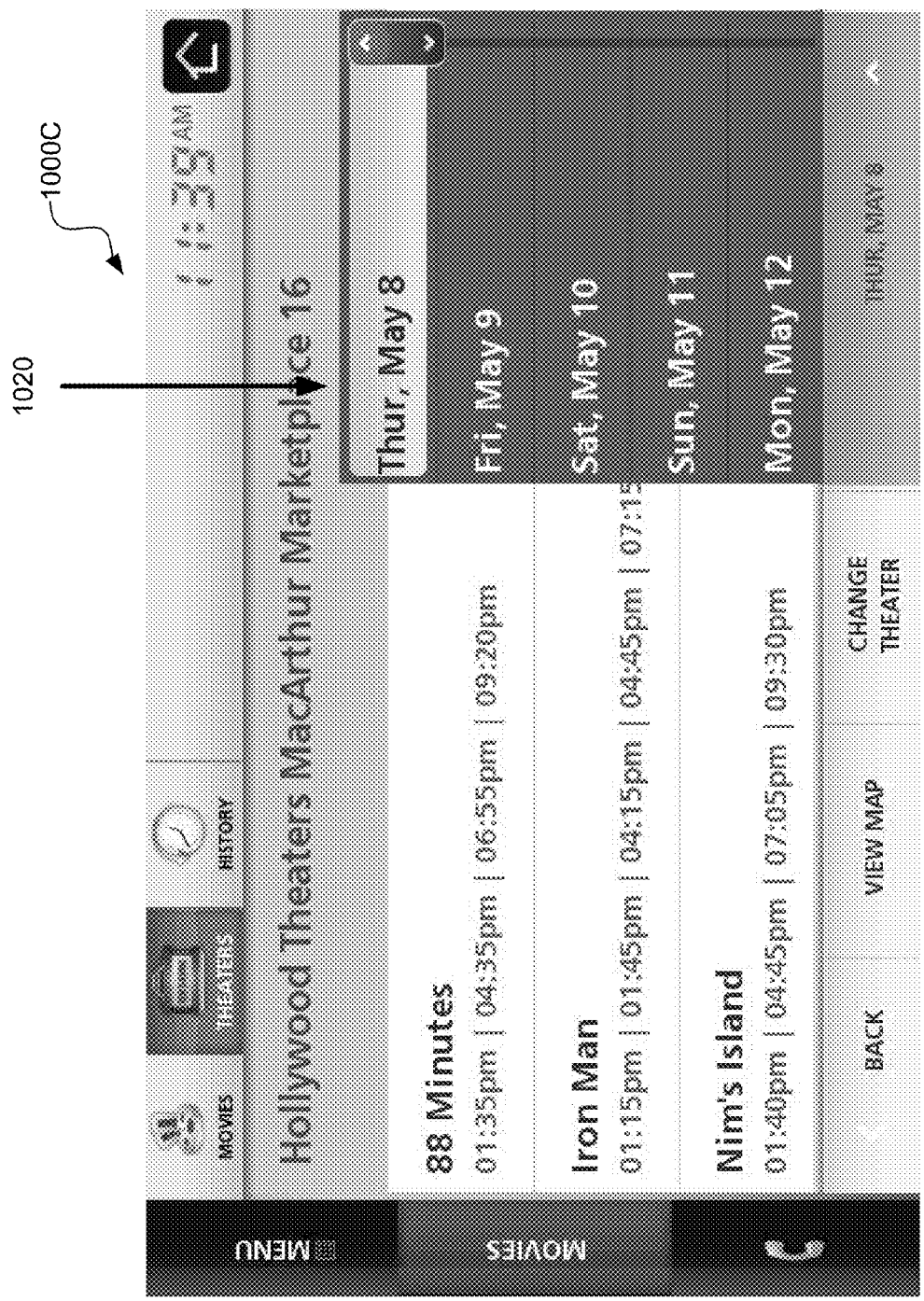

A list of venues may be displayed (block 908). As shown in FIG. 10A, user device 202-4 may display a screen 1000A including a list of venues 1002. List 1002 may include, for example, "AMC Irving Mall 14," Hollywood Theaters MacArthur Market," and "AMC Grand 24." The user may scroll through list 1002 if, for example, there are too many events to list on display 118 at once. In one embodiment, venue images may also be displayed. A ticket icon 1004 may indicate a theater from which the user may purchase tickets through user device 202-4, for example.

A user selection of a venue may be received (block 912). The user of user device 202-4 may select one of the venues in list 1002 by, for example, touching one of the entries. For example, the user may select "AMC Irving Mall 14" in list 1002. Detailed information for the selected event may be displayed (block 914). As shown on screen 1000A, the detailed information may include the address of the venue (e.g., the address of AMC Irving Mall 14). In one embodiment, user device 202-4 may receive the detailed information about the selected event in response to a query to aggregation server 204-1. The user may view a map of the location by touching VIEW MAP button 1006. The user may change the ZIP code that the list of venues is based on by touching CHANGE ZIP button 1007.

In addition, the user may touch SEND TO NAVIGATOR button 1005 and the geographic information associated with the venue may be sent to a navigation device associated with the user. In this case, user device 202-4 may send a message to aggregation server 204-1 regarding forwarding geographic information. Aggregation server 204-1 may store the location (e.g., geographic coordinates) of the selected venue as part of the aggregated venue information collected from venue server 206-x. Aggregation server 204-1 may determine the address (e.g., Internet Protocol (IP) address) of the navigation device from the user profile, for example, and may send the geographic coordinates to the navigation device. In another embodiment, the geographic coordinates of the venue may be stored in user device 202-4 (e.g., they may be received with the venue information) and user device 202-4 may send the geographic coordinates to the navigation device.

Events and event times may be displayed (block 916). For example, a user may touch SHOWTIMES button 1010, as shown on screen 1000A. User device 202-4 may display a list of events 1012, as shown on a screen 1000B in FIG. 10B, hosted by the selected venue (e.g., Hollywood Theaters MacArthur Marketplace 16"). Events in list 1012 may be selected based on the user profile. For example, if the user's profile indicates an interest in basketball, but not concerts, then a list of events for the stadium or arena (which may host basketball and concert events) may include a list of basketball games but not concerts. In one embodiment, user device 202-4 may receive list 1012 in response to a query to aggregation server 204-1. To change the date of the list of events, the user may touch a date button 1008, for example. In response, user device 202-4 may display a list of dates 1020 as shown on a screen 1000C in FIG. 10C.

A user may select an event, for example, by touching an event in list 1012. The user may select any one of the events listed in list 1012 and may be presented with a listing of times as shown on screen 700C in FIG. 7C. The user may then select to purchase tickets as described above with respect to process 500B, blocks 568 to 574.

Figure 11:
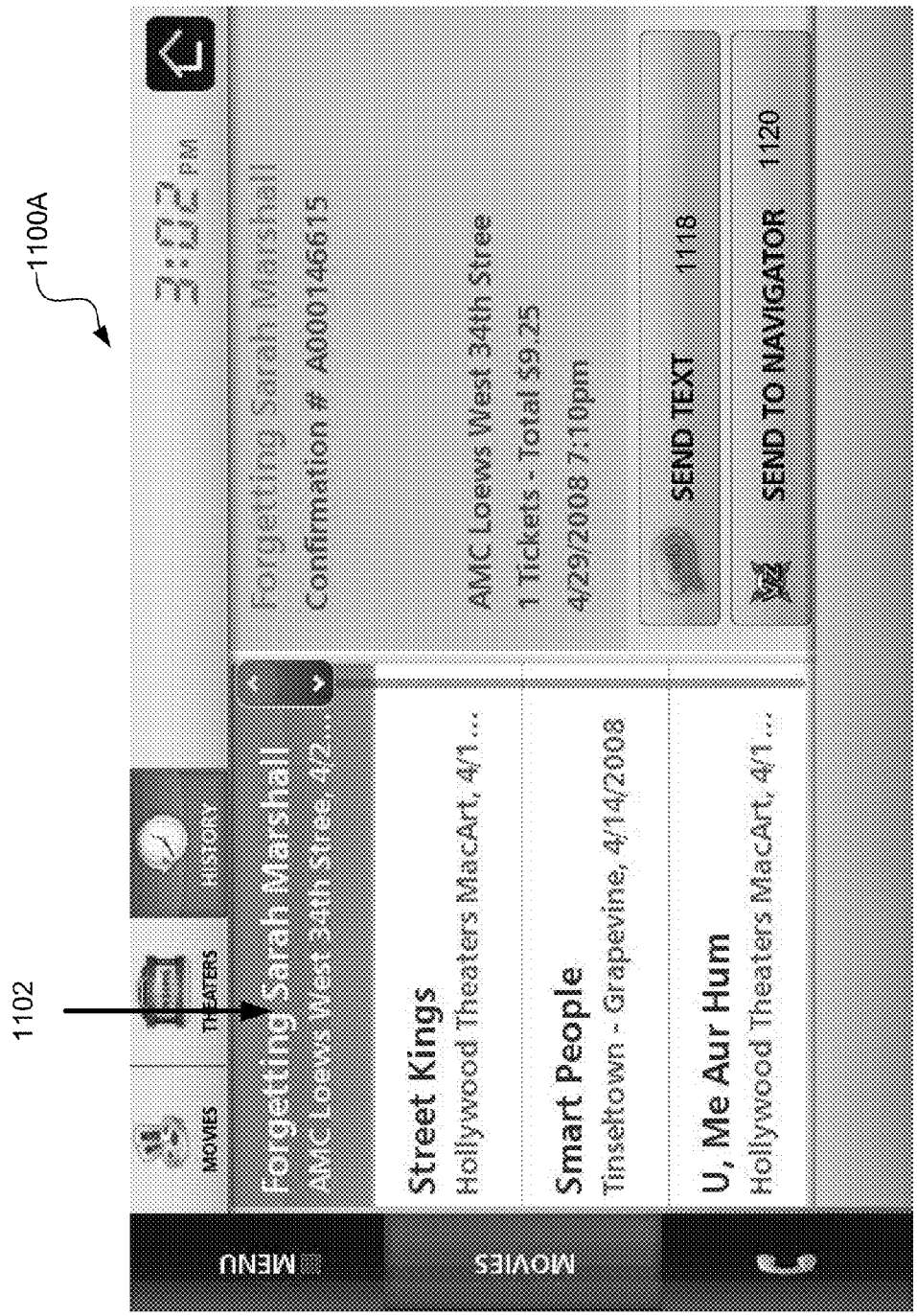

FIG. 11 is a diagram of a graphical user interface that may be shown on display 118 of user device 100, for example. A user may view a screen 1100 by pressing a HISTORY button 668 on screen 600B of FIG. 6B. Screen 1100 may show a list 1102 of the previous event tickets purchased by the current user of user device 202-4, for example. As shown, list 1102 includes the following movies for which tickets have been purchased: "Forgetting Sarah Marshall," "Street Kings," "Smart People," and "U, Me Aur Hum." When the user selects one of the items in the list (e.g., "Forgetting Sarah Marshall"), user device 202-4 may display the details of the event, which may include the venue name, event name, date and time of event, the number of tickets purchased, and the purchase price. This purchase history may be stored in the user profile, which may be stored in user device 202-4. In another embodiment, the user profile including purchase history may be stored in aggregate server 204-x. The user may touch SEND TEXT button 1118, for example, to send the purchase information (e.g., confirmation number and other information) as a text message to a mobile communication device associated with the user profile or any other device (e.g., an automobile). In another embodiment, the purchase information (e.g., confirmation number and the other information) may be sent as an email or as a multi-media message.

The user may touch SEND TO NAVIGATOR button 1120 to send the location of the event to, for example, a navigation device associated with the user profile. In this case, user device 202-4 may send a message to aggregation server 204-1 regarding forwarding geographic information. Aggregation server 204-1 may store the location (e.g., geographic coordinates) of the selected venue as part of the aggregated venue information collected from venue server 206-x. Aggregation server 204-1 may determine the address (e.g., IP address) of the navigation device from the user profile, for example, and may send the geographic coordinates to the navigation device. In another embodiment, the geographic coordinates of the venue may be stored in user device 202-4 (e.g., they may be received with the venue information) and user device 202-4 may send the geographic coordinates to the navigation device.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

While series of blocks have been described above with respect to different processes (e.g., processes 500A, 500B, and 900), the order of the blocks may differ in other implementations. Moreover, non-dependent acts may be performed in parallel.

It will be apparent that aspects of the embodiments, as described above, may be implemented in many different forms of software, firmware, and hardware in the embodiments illustrated in the figures. The actual software code or specialized control hardware used to implement these embodiments is not limiting of the invention. Thus, the operation and behavior of the embodiments were described without reference to the specific software code—it being understood that software and control hardware may be designed to the embodiments based on the description herein.

Further, certain portions may be implemented as "logic" that performs one or more functions. This logic may include hardware, such as an application specific integrated circuit, a field programmable gate array, a processor, or a microprocessor, or a combination of hardware and software.

While particular graphical user interfaces have been described and shown in FIGS. 6A-6D, 7A-7F, 8A-8D, 10A-10C, and 11, these interfaces or screens are purely exemplary. In other embodiments, the interfaces or screens may have different, additional, or differently arranged information and graphics.

Even though particular combinations of features are recited in the claims and/or disclosed in the specification, these combinations are not intended to limit the disclosure. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    aggregating, in a network device, information regarding events, wherein for each event the aggregated information includes an event name, an event time, and an event venue, and wherein the aggregated information is stored in a memory in a network device;
    receiving, in the network device, a request for a list of events or a list of venues from a user device, wherein the user device is separate from the network device;
    receiving, in the network device from the user device, one of a plurality of profiles stored in a user device memory, wherein the received profile is associated with a user of the user device, wherein each profile is associated with a different user, and wherein the received profile includes:
        a number of events for which the user has previously purchased tickets,
        a number of venues to which the user has previously purchased tickets, and
        a record of venues for which the user has indicated interest by repeatedly selecting each venue in the record of venues, and not purchasing tickets for one or more events corresponding to each venue in the record of venues;
    generating the list of events or the list of venues based on an analysis, performed by a computing system in the network device, of the received profile and the aggregated information regarding events, wherein the analysis is based on the record of venues for which the user has indicated interest, and wherein the list of events does not include the number of events for which the user has previously purchased tickets;
    sending, from the network device to the user device, the list of events or the list of venues; and
    receiving, in the network device from the user device, a selection of a venue from the list of venues or a selection of an event from the list of events.

2. The method of claim 1,
    wherein, when the list of venues is sent to the user device, the method further includes sending, from the network device to the user device, a list of events hosted by the selected venue; and
    wherein, when the list of events is sent to the user device, the method further includes sending, from the network device to the user device, a list of venues hosting the selected event.

3. The method of claim 2,
    wherein, when the list of venues hosting the selected event is sent to the user device, the method, further includes:
        receiving, in the network device from the user device, a selection of a venue in response to sending the list of venues hosting the selected event; and
    wherein, when the list of events hosted by the selected venue is sent to the user device, the method further includes:
        receiving, in the network device from the user device, a selection of an event in response to sending the list of events hosted by the selected venue.

4. The method of claim 3, further comprising:
    querying a venue server regarding purchasing a ticket to the selected event at the selected venue; and
    transmitting, from the network device to the user device, information regarding the selected event at the selected venue for recording in the one of the plurality of profiles.

5. The method of claim 3, wherein the user device is non-mobile, and wherein the method further comprises transmitting, to a navigation device separate from the user device and associated with the user, information indicative of a geographical location of the selected venue or a venue associated with the selected event.

6. The method of claim 3, further comprising:
    sending, to a mobile communication device associated with the user, the information regarding the selected event at the selected venue.

7. The method of claim 3, further comprising:
sending, from the network device to the user device, a list of times associated with the selected event at the selected venue;
receiving, in the network device from the user device, a selection of one of the times;
querying a venue server regarding availability of a ticket at the selected time; and
receiving an instruction, in the network device from the user device, to purchase the ticket to the event for the selected time.

8. The method of claim 1, where sending the list of events or the list of venues includes sending, to the user device from the network device, a plurality of images, each of the plurality of images associated with one of the events or one of the venues, the method further comprising:
displaying, on a display attached to the user device, the plurality of images one at a time next to at least two events in the list of events or at least two venues in the list of venues.

9. A user device comprising:
a memory to store a plurality of profiles, each profile associated with a different user, wherein one of the plurality of profiles includes:
a number of events for which the user has previously purchased tickets,
a number of venues to which the user has previously purchased tickets, and
a record of venues for which the user indicated interest by repeatedly selecting each venue in the record of venues, and not purchasing tickets for one or more events corresponding to each venue in the record of venues;
a transmitter to send the one of the plurality of profiles to a network device, wherein the network device is separate from the user device;
a receiver to receive, from the network device, a list of events or a list of venues for which a user of the user device may purchase tickets, and to receive a plurality of images, wherein each of the images is associated with one of the events or venues, wherein the list of events or the list of venues was generated by the network device based on the transmitted one of the plurality of profiles, wherein the list of events does not include the number of events for which the user has previously purchased tickets, and wherein the memory stores the list of events or the list of venues and the plurality of images; and
a display to show, to the user, the list of events or the list of venues next to one or more of the plurality of images, wherein the display cycles through showing the one or more of the plurality of images so as to display all of the plurality of images over a period of time.

10. The user device of claim 9, where the display shows only one of the images at a time.

11. The user device of claim 10, where the display shows the plurality of images in a random order.

12. The user device of claim 9, further comprising:
a processor, coupled to an input device, to receive a request, from the user, for information indicative of a geographical location of one of the venues to be sent to a navigation device; and
wherein the transmitter sends a signal to initiate sending of the information indicative of the geographical information to the navigation device, wherein the navigation device is separate from the user device.

13. A system comprising:
a network device, the network device comprising:
a memory to store event information for a plurality of events, wherein, for each event, the event information includes an event name, an event time, and an event venue;
a receiver to receive, from a user device separate from the network device, a request for events or venues, wherein the receiver receives, from the user device, one of a plurality of profiles stored in the user device, wherein the received profile is associated with a user of the user device, wherein the received profile includes information indicative of preferences of the user with respect to venues and events, wherein each of the plurality of profiles is associated with a different user, and wherein the received profile includes:
a number of events for which the user has previously purchased tickets,
a number of venues to which the user has previously purchased tickets, and
a record of venues for which the user has indicated interest by repeatedly selecting each venue in the record of venues, and not purchasing tickets for one or more events corresponding to each venue in the record of venues;
processing logic to generate, based on the received profile and the event information, a list of events or a list of venues in response to the request wherein the list of events does not include the number of events for which the user has previously purchased tickets; and
a transmitter to send, to the user device, the list of events or the list of venues, wherein the receiver is configured to receive, from the user device, a selection of a venue from the list of venues or a selection of an event from the list of events, and wherein the receiver is configured to receive an instruction to send information indicative of a geographical location of the selected venue or a venue associated with the selected event.

14. The system of claim 13, further comprising the user device, the user device comprising:
a memory to store the plurality of profiles;
a display to show the list of venues or the list of events to the user; and
a transceiver to send, to the network device, a selection of a venue in response to displaying the list of venues, and receive, from the network device, a list of events hosted by the selected venue,
where the transceiver is configured to send, to the network device, a selection of an event in response to displaying the list of events, and receive, from the network device, a list of venues hosting the selected event.

15. The system of claim 14,
where the receiver in the network device is configured to receive, from the user device, a selection of a venue in response to sending the list of venues hosting the selected event; and
where the receiver in the network device is configured to receive, from the user device, a selection of an event in response to sending the list of events hosted by the selected venue.

16. The system of claim 15,
where the transmitter in the network device is configured to send a query to a venue server regarding purchasing a ticket to the selected event at the selected venue; and where the transmitter in the network device is configured to send, to the user device, information regarding the ticket for storing in the one of the plurality of profiles in the user device.

17. The system of claim 15, wherein the user device is non-mobile, and wherein the transmitter is configured to transmit, to a navigation device separate from the user device and associated with the user, the information indicative of the geographical location of the selected venue or the venue associated with the selected event.

18. The system of claim 15,
where the receiver in the network device is configured to receive a request for a confirmation associated with the purchased ticket; and
where the transmitter in the network device is configured to send, to a mobile communication device associated with the user, the confirmation associated with the purchased ticket.

19. The system of claim 15,
wherein the transmitter in the network device sends, to the user device, a list of times associated with the selected event at the selected venue;
wherein the receiver in the network device is configured to receive, from the user device, a selection of one of the times;
wherein the transmitter in the network device is configured to send a query to a venue server regarding availability of a ticket at the selected time; and
wherein the receiver in the network device is configured to receive an instruction from the user device to purchase the ticket to the selected event at the selected time.

20. The system of claim 13, where the system further comprises the user device, the user device including:
a memory to store the plurality of profiles; and
a display to show the list of venues or the list of events and a plurality of images, where each of the plurality of images corresponds to one of the events or one of the venues, where the display shows one of the plurality of images at a time next to at least two events in the list of events or at least two venues in the list of venues.

21. A non-transitory computer-readable memory device storing instructions executable by at least one processor to cause the at least one processor to perform a method comprising:
receiving a request for a list of events or a list of venues from a user;
sending, from a user device to a network device separate from the user device, one of a plurality of profiles stored in a memory, wherein the one of the plurality of profiles is associated with a user of the user device for the generation, based on the one of the plurality of profiles, of the list of events or the list of venues, wherein the sent profile includes:
a number of events for which the user has previously purchased tickets,
a number of venues to which the user has previously purchased tickets, and
a record of venues for which the user has indicated interest by repeatedly selecting each venue in the record of venues, and not purchasing tickets for one or more events corresponding to each venue in the list of venues, wherein each of the plurality of profiles is associated with a different user;
receiving, in the user device from the network device, the list of events or the list of venues, wherein the list of events does not include the number of events for which the user has previously purchased tickets;
receiving, from the user, a selection of a venue from the list of venues or a selection of an event from the list of events; and
receiving, from the user, an instruction to transmit, to a navigation device separate from the user device and associated with the user, information indicative of a geographical location of the selected venue or a venue associated with the selected event.

22. The non-transitory computer-readable memory device of claim 21, wherein the method further comprises:
receiving a plurality of images, each of the plurality of images associated with one of the events or one of the venues in the list of events or the list of venues; and
displaying the plurality of images one at a time next to the list of events or the list of venues.

* * * * *